United States Patent
Kawamura et al.

(10) Patent No.: US 12,322,760 B2
(45) Date of Patent: Jun. 3, 2025

(54) SECONDARY BATTERY

(71) Applicant: SANYO Electric Co., Ltd., Kadoma (JP)

(72) Inventors: Atsushi Kawamura, Hyogo (JP); Daiki Watanabe, Hyogo (JP); Yu Matsui, Hyogo (JP); Shingo Tode, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 411 days.

(21) Appl. No.: 17/786,272

(22) PCT Filed: Dec. 15, 2020

(86) PCT No.: PCT/JP2020/046640
§ 371 (c)(1),
(2) Date: Jun. 16, 2022

(87) PCT Pub. No.: WO2021/131878
PCT Pub. Date: Jul. 1, 2021

(65) Prior Publication Data
US 2022/0384854 A1    Dec. 1, 2022

(30) Foreign Application Priority Data
Dec. 26, 2019 (JP) .................................. 2019-236698

(51) Int. Cl.
*H01M 50/46* (2021.01)
*H01M 10/0585* (2010.01)
(Continued)

(52) U.S. Cl.
CPC ... *H01M 10/0587* (2013.01); *H01M 10/0585* (2013.01); *H01M 50/103* (2021.01); *H01M 50/409* (2021.01); *H01M 50/461* (2021.01)

(58) Field of Classification Search
CPC ......... H01M 10/0585; H01M 10/0587; H01M 50/449; H01M 50/457; H01M 50/461
See application file for complete search history.

(56) References Cited

U.S. PATENT DOCUMENTS 9,825,270 B2 * 11/2017 Moon .................... H01M 50/42
2015/0140402 A1 * 5/2015 Kim ..................... H01M 50/461
429/144
(Continued)

FOREIGN PATENT DOCUMENTS

CN      107004812 A    8/2017
CN      110556495 A   12/2019
(Continued)

OTHER PUBLICATIONS

International Search Report dated Feb. 22, 2021, issued in counterpart International Application No. PCT/JP2020/046640, w/English Translation. (5 pages).

(Continued)

*Primary Examiner* — Kevin E Yoon
(74) *Attorney, Agent, or Firm* — WHDA, LLP

(57) ABSTRACT

A secondary battery configured so as to comprise: a plurality of positive electrodes each including a positive electrode core and a positive electrode active substance disposed on the positive electrode core; a plurality of negative electrodes each including a negative electrode core and a negative electrode active substance disposed upon the negative electrode core; at least one separator; and an adhesive coated so as to have a substantially constant area density on at least one side surface in the thickness direction of the separator. The secondary battery includes a laminated section in which the positive electrodes and the negative electrodes are alternately stacked, having the separator therebetween. The area of adhered sections adhered by the adhesive is greater on the outside in the lamination direction of the laminated section than on the inside in the lamination direction.

7 Claims, 21 Drawing Sheets

(51) Int. Cl.
    *H01M 10/0587*    (2010.01)
    *H01M 50/103*     (2021.01)
    *H01M 50/409*     (2021.01)

(56) References Cited

U.S. PATENT DOCUMENTS

| | | |
|---|---|---|
| 2017/0338459 A1 | 11/2017 | Nakahiro et al. |
| 2019/0221808 A1 | 7/2019 | Honda et al. |
| 2021/0218049 A1 | 7/2021 | Nakagawa et al. |

FOREIGN PATENT DOCUMENTS

| | | | |
|---|---|---|---|
| CN | 110854347 A | 2/2020 | |
| JP | 2014-26943 A | 2/2014 | |
| JP | 2016-197505 A | 11/2016 | |
| KR | 20060042325 A | 5/2006 | |
| WO | 2018/060773 A1 | 4/2018 | |
| WO | WO-2018154777 A1 * | 8/2018 | ........ H01M 10/0404 |
| WO | WO-2018207530 A1 * | 11/2018 | .......... H01M 10/052 |
| WO | WO-2019039357 A1 * | 2/2019 | ............. B32B 25/08 |
| WO | 2019/230536 A1 | 12/2019 | |

OTHER PUBLICATIONS

Office Action dated Sep. 29, 2022, issued in counterpart IN Application No. 202247034736, with English Translation. (6 pages).
Office Action dated Feb. 28, 2025 issued in counterpart CN application No. 202080087094.4 with English translation of Search Report. (10 pages).

\* cited by examiner

SECONDARY BATTERY

CROSS-REFERENCE TO RELATED APPLICATIONS

This application is a national stage of International Application No. PCT/JP2020/046640, filed Dec. 15, 2020, which claims priority to Japanese Patent Application No. 2019-236698 filed Dec. 26, 2019 both of which are hereby incorporated by reference in their entirety.

TECHNICAL FIELD

The present disclosure relates to a secondary battery.

BACKGROUND ART

In recent years, the demand for secondary batteries has been increasing in a variety of situations. Among them, lithium ion secondary batteries using nonaqueous electrolytes have been attracting attention because of their high energy density. One form of such secondary batteries is disclosed in Patent Literature 1. In this form of the secondary battery, a flat electrode assembly consisting of a plurality of layers of positive electrode plates and negative electrode plates stacked via separators is inserted into an outer package. In the positive electrode plate, a positive electrode active material mixture layer is provided on both sides of a positive electrode core body. In the negative electrode plate, a negative electrode active material mixture layer is provided on both sides of a negative electrode core body. The negative electrode active material and the positive electrode active material have a structure capable of intercalation and deintercalation of lithium ions. The separators are made of a porous material that allows lithium ions to permeate, while preventing short-circuit caused by the electrical contact between the negative electrode plates and the positive electrode plates.

The negative electrode plates and the positive electrode plates are each electrically connected to a current collector plate and inserted into the outer package. The outer package is sealed after being filled with an electrolyte. To prevent direct contact between the positive electrode and the negative electrode due to shrinking of the separator, the secondary battery includes an adhesive layer on the surface of the separator to bond the positive electrode plate with the separator and the negative electrode plate with the separator by thermocompression bonding.

CITATION LIST

PATENT LITERATURE 1: JP 2014-26943 A

SUMMARY

In the secondary battery of Patent Literature 1, separators with different amounts and areas of adhesive are used to prevent uneven melting of the adhesive layer and reduce the difference of ion permeability, but the need for multiple separators with different amounts and areas of adhesive makes it difficult to achieve high productivity.

Furthermore, since high durability is required, especially in the secondary batteries for automotive applications, it is desirable if the amount of electrolyte retained can be uniform regardless of the position of the electrode body in the stacking direction.

In order to solve the above problem, a secondary battery according to the present disclosure includes a positive electrode including a positive electrode core body and a positive electrode active material disposed on the positive electrode core body, a negative electrode including a negative electrode core body and a negative electrode active material disposed on the negative electrode core body, at least one separator, and an adhesive applied to at least one side surface of the separator in a thickness direction with an approximately constant area density, in which the positive electrode and the negative electrode are alternatively stacked via the separator to form a stacked body, and an area of a bonded portion of the adhesive is larger at an outer part in the stacking direction of the stacked body than at an inner part in the stacking direction.

The requirement that "the area of the bonded portion of the adhesive is larger at the outer part in the stacking direction of the stacked body than at the inner part in the stacking direction" is to be satisfied when, in a case that the secondary battery includes a stacked electrode assembly, the area of the bonded portion of the adhesive applied to each of the two outermost separators of the stacked body is larger than the area of the adhesive applied to the one or two separators located in the center of the stacked body (one separator when an odd number of layers are stacked, and two separators when an even number of layers are stacked).

In addition, the requirement that "the area of the bonded portion of the adhesive is larger at the outer part in the stacking direction of the stacked body than at the inner part in the stacking direction" is to be satisfied when, in a case that the secondary battery includes a wound electrode assembly, the area of the bonded portion of the adhesive applied to a portion of the separator located at the outermost circumference is larger than the area of the bonded portion of the adhesive applied to a portion of the separator located at the innermost circumference.

When the secondary battery includes the stacked electrode assembly, the stacked body may be regarded as a region where all of the positive electrodes, the negative electrodes, and the separators are stacked on top of each other when viewed in the stacking direction. The stacked body may be an electrode assembly or an electrode group. Alternatively, when the secondary battery includes the wound electrode assembly and the electrode assembly is flat, a local region parallel to the press plate that presses the electrode body to a flat shape has a stacked structure in which the positive electrode, the negative electrode, and the separator are stacked with the separator interposed between the positive electrode and the negative electrode. Therefore, in the case of the secondary battery including the wound electrode body, such a local region in the circumferential direction can be regarded as the stacked body and, in that case, the separator located on the innermost circumference side and the separator located on the outermost circumference side can be determined.

According to the present disclosure, the secondary battery that can easily retain a uniform amount of electrolyte regardless of the position in the stacking direction, is resistant to deterioration, and facilitates mass-production can be provided.

DESCRIPTION OF EMBODIMENTS

Figure 1:
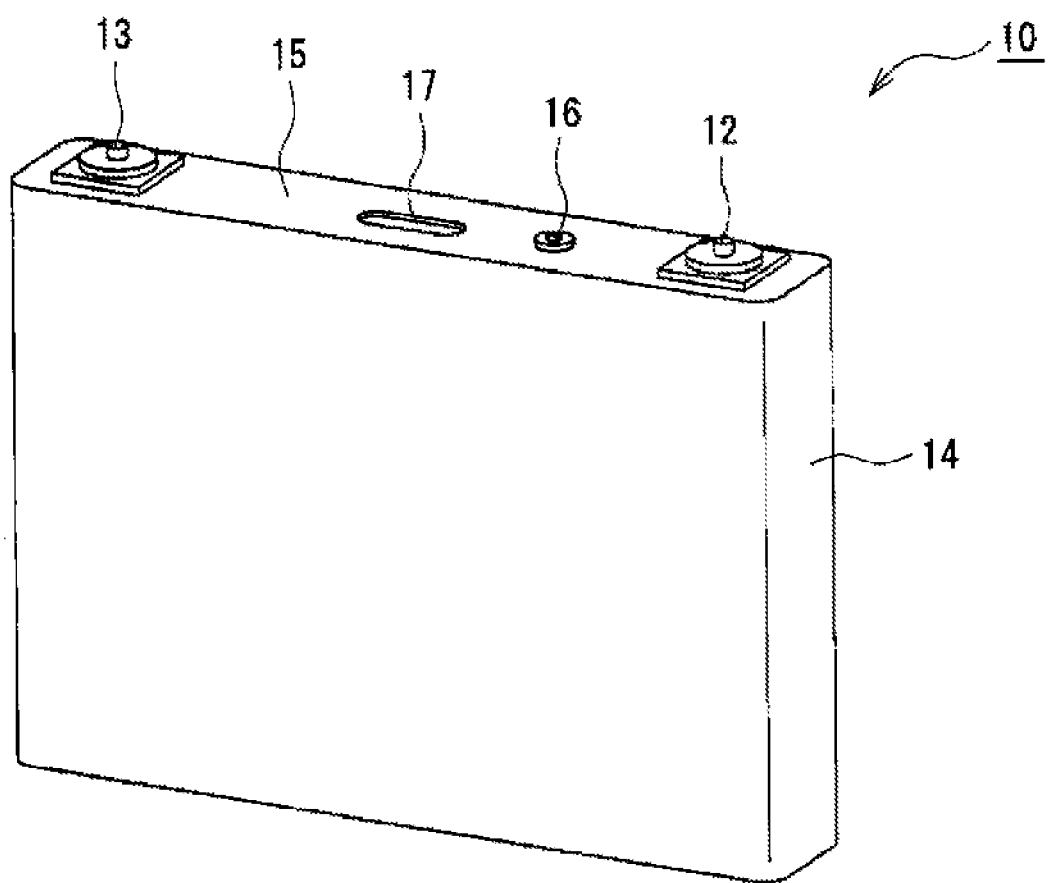
FIG. 1 is a perspective view of a rectangular secondary battery according to an embodiment of the present disclosure.

An embodiment of the present disclosure will be described in detail below with reference to the accompanying drawings. When multiple embodiments, modifications, and the like are included in the following, it is assumed from the outset that new embodiments may be constructed by combining their characteristic parts as appropriate. In the following examples, the same reference signs are assigned to the same components in the drawings, and their explanations are not repeated. Among the components described below, the components that are not described in the independent claims that represent the highest concept are optional components and are not essential components. In the present specification, the phrase "from numerical value A to numerical value B" means "numerical value A or higher and numerical value B or lower". Also, in the following description, the height direction of an outer can 14, 140 represents the "vertical direction" of a secondary battery 10, 110, the sealing plate 15, 123 side represents the "upper" direction, and the bottom side of the outer can 14, 140 side represents the "lower" direction. The direction along the longitudinal direction of the sealing plate 15, 123 represents the "horizontal direction" of the secondary battery 10, 110.

Figure 2:
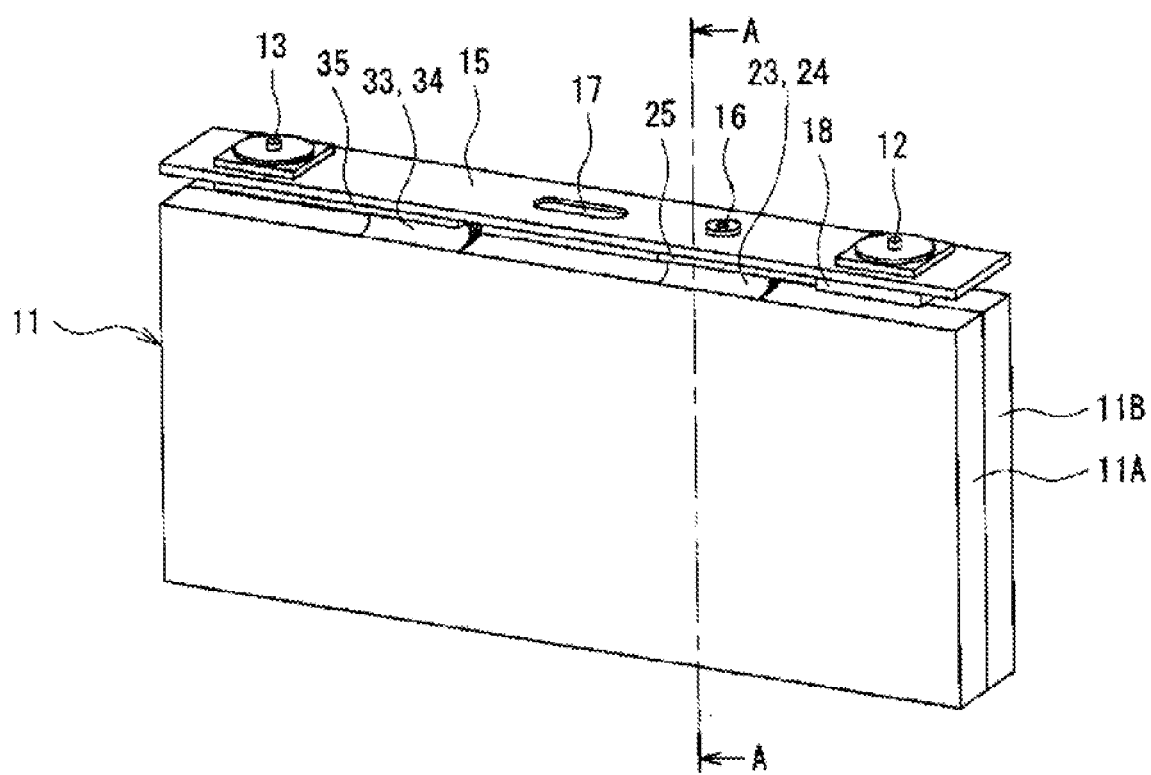
FIG. 2 is a perspective view of an electrode assembly and a sealing plate that constitute the rectangular secondary battery according to the embodiment of the present disclosure.

FIG. 1 is a perspective view of a rectangular secondary battery 10 according to an embodiment of the present disclosure, FIG. 2 is a perspective view of an electrode assembly 11 and a sealing plate 15 constituting the rectangular secondary battery 10 (with an outer can 14 removed). As illustrated in FIGS. 1 and 2, the rectangular secondary battery (hereinafter will simply be referred to as the "secondary battery") 10 includes, but not limited to, a rectangular container including the outer can 14 and the sealing plate 15 as the outer package.

As illustrated in FIGS. 1 and 2, the secondary battery 10 includes an electrode assembly 11, an electrolyte, a bottomed tubular outer can 14 that stores the electrode assembly 11 and the electrolyte, and a sealing plate 15 to which a positive electrode terminal 12 and a negative electrode terminal 13 are attached and which closes an opening of the outer can 14. As will be described in detail later in connection with FIG. 3, the electrode assembly 11 has a structure in which the positive electrode 20 and the negative electrode 30 are alternately stacked via a separator 40. The outer can 14 is a rectangular metal container having a flat rectangular shape with its one end in the height direction being opened. The outer can 14 and the sealing plate 15 are made of a metal material that mainly contains, for example, aluminum.

The electrolyte may be an aqueous electrolyte, but preferably nonaqueous electrolyte, and the nonaqueous electrolyte is used in the present embodiment. The nonaqueous electrolyte includes, for example, an nonaqueous solvent and an electrolyte salt dissolved in the nonaqueous solvent. As the nonaqueous solvent, for example, esters, ethers, nitriles, amides, a mixed solvent of two or more thereof, or the like may be used. The nonaqueous solvent may contain a halogen substitute obtained by substituting at least a part of hydrogen of the above solvents with halogen atoms such as fluorine. As the electrolyte salt, a lithium salt such as $LiPF_6$ or the like is used.

As mentioned above, the positive electrode terminal 12 and the negative electrode terminal 13 are attached to the sealing plate 15. The sealing plate 15 has an elongated rectangular shape with the positive electrode terminal 12 located on one end side in the longitudinal direction and the negative electrode terminal 13 located at the other end side in the longitudinal direction. The positive electrode terminal 12 and the negative electrode terminal 13 are external connection terminals that are electrically connected to another secondary battery 10 or a load, and are attached to the sealing plate 15 via an insulating member.

As will be described in more detail later, the positive electrode 20 includes a positive electrode tab 23 that is electrically connected to the positive electrode terminal 12, and the negative electrode 30 includes a negative electrode tab 33 that is electrically connected to the negative electrode terminal 13. The positive electrode terminal 12 is electrically connected to a positive electrode tab group 24 formed by a plurality of positive electrode tabs 23 stacked via a positive electrode current collector plate 25, and the negative electrode terminal 13 is electrically connected to a negative electrode tab group 34 formed by a plurality of negative terminal tabs 33 stacked via a negative electrode current collector plate 35.

The sealing plate 15 includes a current shut-off device 18 as a functional component to cut off the current path in the event of a battery abnormality. The functional component is, for example, a component that functions as a safety device or a control device for the secondary battery 10. The functional component is disposed on the inner surface of the sealing plate 15 in close proximity to the positive electrode terminal 12 or the negative electrode terminal 13. In the present embodiment, the current shut-off device 18 is attached to the positive electrode terminal 12 and is located inside the positive electrode terminal 12.

The current shut-off device 18 is a pressure-sensing safety device that interrupts the current path when an abnormality occurs in the secondary battery 10 to cause the internal pressure of the outer can 14 to soar above a predetermined pressure. The current shut-off device 18 is disposed, for example, between the positive electrode terminal 12 and the positive electrode current collector plate 25, and is electrically connected to the positive electrode terminal 12 and the positive electrode current collector plate 25 during normal use. The structure of the current shut-off device 18 is not limited, but one example is a device including a reversing plate that reverses away from the positive electrode current collector plate 25 when the internal pressure rises to cut the electrical connection with the positive electrode current collector plate 25, thus interrupting the current path between the positive electrode terminal 12 and the positive electrode current collector plate 25.

The sealing plate 15 also has an injection port 16 for injecting the nonaqueous electrolyte, and a gas discharge valve 17 that opens and discharges gas in the event of battery malfunctions. The gas discharge valve 17 is located in the center of the sealing plate 15 in the longitudinal direction, and the injection port 16 is located between the positive electrode terminal 12 and the gas discharge valve 17, respectively.

As illustrated in FIG. 2, the electrode assembly 11 is divided into a first electrode group 11A and a second electrode group 11B. The electrode groups 11A and 11B have, for example, the same stacking structure and dimensions, and are stacked and arranged in the thickness direction of the electrode assembly 11. At the upper end of each electrode group, a positive electrode tab group 24 formed by a plurality of positive electrode tabs 23 and a negative electrode tab group 34 formed by a plurality of negative electrode tabs 33 are provided, and each electrode group is connected to a corresponding collector plate of the sealing plate 15. Each of the electrode groups 11A, 11B is covered with a separator 40 around the outer periphery to enable independent battery reactions in the electrode groups 11A, 11B.

Figure 3:
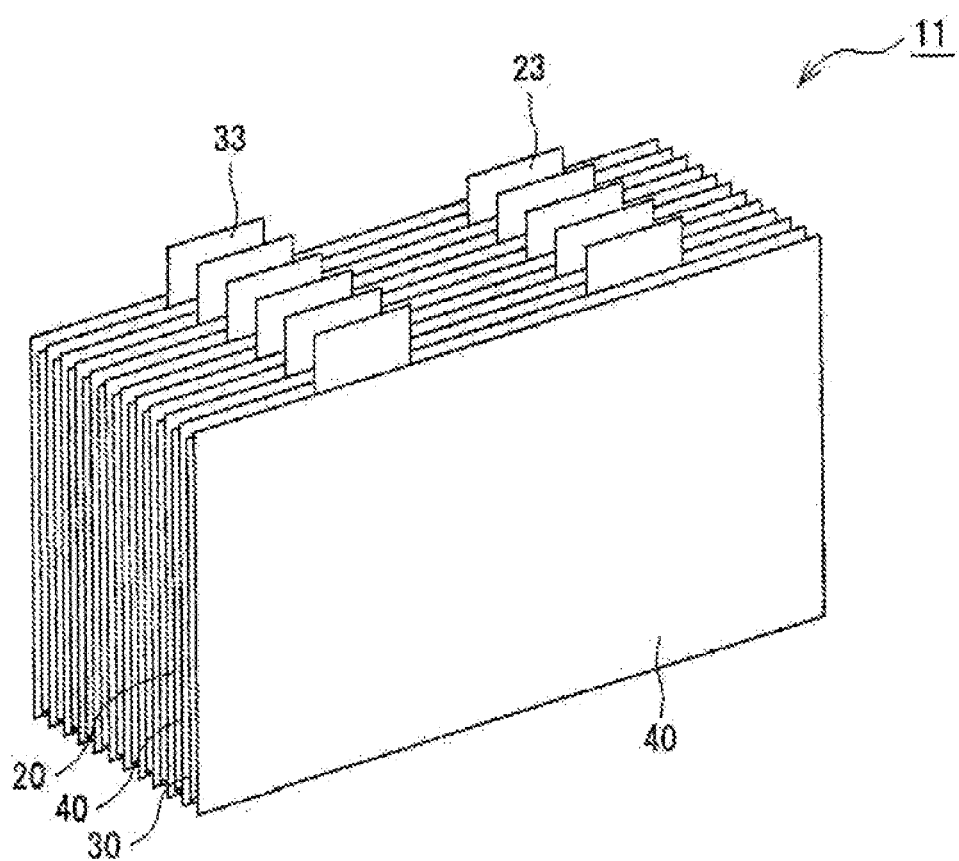
FIG. 3 is an exploded perspective view of the electrode assembly of the rectangular secondary battery.

FIG. 3 is an exploded view of the electrode assembly 11. As illustrated in FIG. 3, the electrode assembly 11 includes a plurality of positive electrodes 20 and a plurality of negative electrodes 30. The electrode groups 11A, 11B constituting the electrode assembly 11 each includes, for example, one more negative electrode 30 than the positive electrodes 20, so that the negative electrode 30 is located on both sides of the electrode groups 11A, 11B in the thickness direction. Although FIG. 3 illustrates a plurality of separators 40 placed one by one between the positive electrodes 20 and the negative electrodes 30, only one separator may be placed in the electrode groups 11A, 11B. In that case, a long separator 40 is folded in a zigzag and placed between the positive electrodes 20 and the negative electrodes 30. As will be described in detail later, in the present embodiment, each of the electrode groups 11A, 11B includes an adhesive and is fabricated by a heat pressing process. Specifically, each of the electrode groups 11A, 11B is formed by the plurality of positive electrodes 20 and the plurality of negative electrodes 30 alternately stacked one on top of the other via the separator 40, and is pressed in the stacking direction using a pair of hot plates to apply heat and pressure to the stacked body to allow at least a portion of the adhesive to develop the adhesive strength.

Thus, the electrode assembly 11 includes the electrode group 11A and the electrode group 11B fabricated as described above as the stacked electrode assembly composed of the plurality of positive electrodes 20 and the plurality of negative electrodes 30 alternately stacked one on top of the other via the separator 40. The positive electrodes 20 each have an upwardly protruding positive electrode tab 23, and the negative electrodes 30 each have an upwardly protruding negative electrode tab 33. In other words, the positive electrodes 20 and the negative electrodes 30 are stacked and arranged so that those tabs face the same direction. The positive electrode tabs 23 are located at one end side of the electrode assembly 11 in the horizontal direction, and the negative electrode tabs 33 are located at the other end side of the electrode assembly 11 in the horizontal direction, while that the plurality of positive electrode tabs 23 is stacked and lined up in the thickness direction of the electrode assembly 11, and the plurality of negative electrode tabs 33 is stacked and lined up in the thickness direction of the electrode assembly 11.

The positive electrodes 20 includes a positive electrode core body and a positive electrode mixture layer disposed on the surface of the positive electrode core body. The positive electrode core body can be made of metal foil of, for example, aluminum or aluminum alloy that is stable in the potential range of the positive electrode 20, or a film with such a metal disposed on the surface layer. The positive electrode mixture layer includes a positive electrode active material, a conductive material, and a binder material, and is preferably provided on both sides of the positive electrode core body. The positive electrode 20 can be fabricated by, for example, applying a positive electrode mixture slurry including the positive electrode active material, the conductive material, the binder material, and the like to the positive electrode core body, allowing it to dry, and then compressing it to form the positive electrode mixture layer on both sides of the positive electrode core body.

The positive electrode 20 has a structure in which the positive electrode mixture layer made of a positive electrode mixture material is formed over the entire surface of the positive electrode core body except for the positive electrode tab 23 (hereinafter referred to as the "base portion"). A thickness of the positive electrode core body is, for example, from 5 μm to 20 μm, and preferably from 8 μm to 15 μm. The base portion of the positive electrode core body has a rectangular shape in front view, and the positive electrode tab 23 protrudes from one side of the rectangle. Typically, the positive electrode core body is made of a single sheet of metal foil by processing it to form the base portion and the positive electrode tab 23 in one piece.

A lithium transition metal composite oxide is used as the positive electrode active material. The metal elements included in the lithium transition metal composite oxide are Ni, Co, Mn, Al, B, Mg, Ti, V, Cr, Fe, Cu, Zn, Ga Sr, Zr, Nb, In, Sn, Ta, W, and the like. Among them, it is preferable to include at least one of Ni, Co, and Mn. Example of a suitable composite oxide are a lithium transition metal composite oxide containing Ni, Co, and Mn, and a lithium transition metal composite oxide containing Ni, Co, and Al.

Examples of the conductive material used in the positive layer mixture layer include carbon materials such as carbon black, acetylene black, ketjen black, and graphite. Examples of the binder material used in the positive electrode mixture layer include fluorine resins such as polytetrafluoroethylene (PTFE) and polyvinylidene difluoride (PVdF), polyacrylonitrile (PAN), polyimide resins, acrylic resins, polyolefin resins, and the like. In addition, these resins can be used in combination with cellulose derivatives such as carboxymethyl cellulose (CMC) or its salt, polyethylene oxide (PEO), and the like.

The negative electrodes 30 includes a negative electrode core body and a negative electrode mixture layer disposed on the surface of the negative electrode core body and composed of a negative electrode mixture material. The negative electrode core body can be made of metal foil of, for example, copper that is stable in the potential range of the negative electrode 30, or a film with such a metal arranged on the surface layer. The negative electrode mixture layer includes a negative electrode active material and a binder material, and is preferably provided on both sides of the negative electrode core body. The negative electrode 30 can be fabricated by, for example, applying a negative electrode mixture slurry including a negative electrode active material, a binder material, and the like to the negative electrode core body, allowing it to dry, and then compressing it to form the negative electrode mixture layer on both sides of the negative electrode core body.

The negative electrode 30 has a structure in which the negative electrode mixture layer is formed over the entire surface of the base portion of the negative electrode core body except for the negative electrode tab 33. A thickness of the negative electrode core body is, for example, from 3 µm to 15 µm, and preferably from 5 µm to 10 µm. As in the case of the positive electrode 20, the base portion of the negative electrode core body has a rectangular shape in front view, and the negative electrode tab 33 protrudes from one side of the rectangle. Typically, the negative electrode core body is made of a single sheet of metal foil by processing it to form the base portion and the negative electrode tab 33 in one piece.

As the negative electrode active material, for example, a carbon-based active material that reversibly intercalates and de-intercalates lithium ions is used. Suitable carbon-based active materials include natural graphite such as flake graphite, vein graphite, or amorphous graphite, and artificial graphite such as massive artificial graphite (MAG) or graphitized mesophase carbon microbeads (MCMB). An Si-based active material consisting of at least one of Si and an Si-containing compound may also be used for the negative electrode active material, or a carbon-based active material and an Si-based active material may be used together.

For the binder material in the positive electrode mixture layer, fluorine resins, PAN, polyimides, acrylic resins, polyolefins, or the like can be used, as in the case of the positive electrode 20, but it is preferable to use styrene-butadiene rubber (SBR). Furthermore, the negative electrode mixture layer preferably includes CMC or its salt, polyacrylic acid (PAA) or its salt, polyvinyl alcohol (PVA), or the like. Among them, it is preferable to use SBR, CMC or its salt, and PAA or its salt together.

Figure 4:
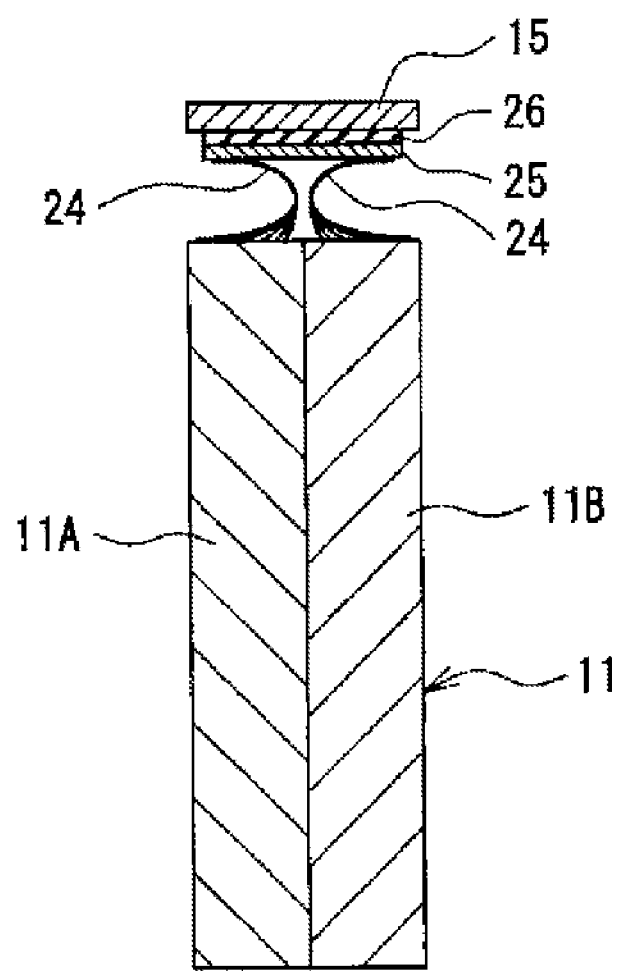
FIG. 4 is a schematic cross-sectional view taken along line A-A of FIG. 2.

FIG. 4 schematically illustrates a cross-section taken along line A-A of FIG. 2. In the following, by referring to FIGS. 2 and 4, the structure of the positive electrode tab group 24 and the negative electrode tab group 34 of the electrode assembly 11 is described in detail. As illustrated in FIGS. 2 and 4, the electrode assembly 11 includes the positive electrode tab group 24 consisting of the plurality of positive electrode tabs 23, and the negative electrode tab group 34 consisting of the plurality of negative electrode tabs 33. The positive electrode tab group 24 is formed by overlapping the plurality of positive electrode tabs 23 in the stacking direction of the electrodes, and is provided for each electrode group 11A, 11B. Similarly, the negative electrode tab group 34 is formed by overlapping the plurality of negative electrode tabs 33 in the stacking direction of the electrodes, and provided for each electrode group 11A, 11B.

The positive electrode tab group 24 is bonded by welding or the like to the positive electrode current collector plate 25 attached to the inner surface (lower surface) of the sealing plate 15. The positive electrode current collector plate 25 is a plate-shaped conductive member that is electrically connected to the positive electrode terminal 12 via the current shut-off device 18 as described above. An insulating member 26 is interposed between the sealing plate 15 and the positive electrode current collector plate 25 to prevent contact between the two members. Similarly, the negative electrode tab group 34 is bonded by welding or the like to the negative electrode current collector plate 35 attached to the inner surface of the sealing plate 15 via an insulating member.

The positive electrode tab group 24 and the negative electrode tab group 34 may not have a particular shape and can be of any shape that allows them to function as conductive paths connecting the electrode assembly 11 to each terminal. In the examples illustrated in FIGS. 2 and 4, the plurality of positive electrode tabs 23 and the plurality of negative electrode tabs 33 of the electrode group 11A are respectively stacked in a curved state from the outside to the inside of the secondary battery 10 to form the positive electrode tab group 24 and the negative electrode tab group 34 both having a substantially U-shape in cross-sectional view. Similarly, the electrode group 11B also has such tab groups with a substantially U-shape in cross-sectional view. Each tab group may have a U-shape curving from the inside to the outside of the secondary battery 10. As illustrated in FIG. 4, the tab groups of the two stacked electrode tab groups may be arranged so that the cross-sectional shape of one tab group is substantially symmetrical to the cross-sectional shape of the other tab group with respect to the boundary between the electrode groups.

The positive electrode tab group 24 may be welded to the upper surface of the positive electrode current collector plate 25 facing the sealing plate 15, but is preferably welded to the lower surface of the positive electrode current collector plate 25. Although both the positive electrode tab group 24 and the negative electrode tab group 34 are welded to the lower surface of the current collector plate in the present embodiment, it may be possible that, for example, the positive electrode tab group 24 is welded to the lower surface of the positive electrode current collector plate 25, and the negative electrode tab group 34 is welded to the upper surface of the negative electrode current collector plate 35. Also, the present embodiment has described the electrode assembly 11 including divided electrode groups, that is, the first electrode group 11A and the second electrode group 11B, but the electrode assembly may include a single undivided electrode group.

For example, the sealing plate 15 is fitted to the opening of the outer can 14, and the fitted portion of the sealing plate 15 and the outer can 14 to which the electrode assembly 11 is attached is welded by laser. Subsequently, a nonaqueous electrolyte is injected into the outer can 14 from the injection port 16 which is then sealed with blind rivets to form the secondary battery 10.

Figure 5A:
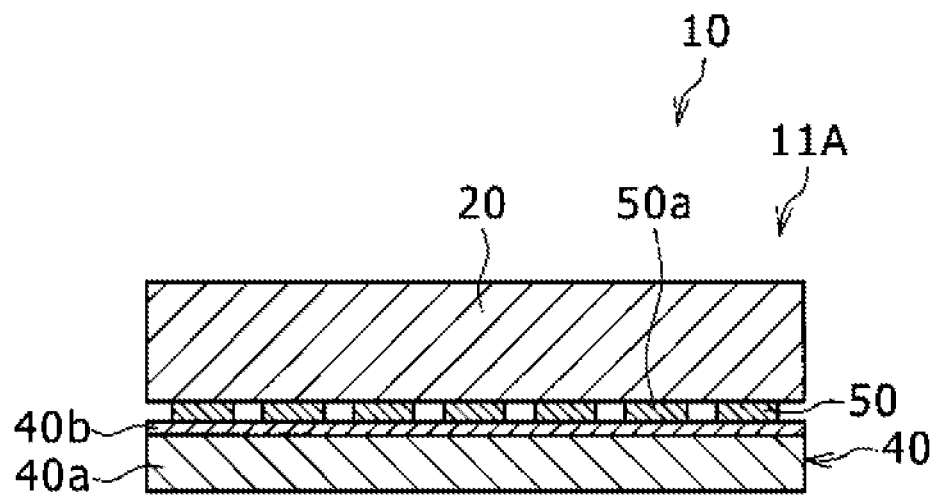
FIG. 5A is an enlarged schematic cross-sectional view of a portion of the outer part of a first electrode group in the stacking direction when taken along a plane orthogonal to the height direction.

Next, the structure of the first electrode group 11A and the separator 40 is described in more detail. The second electrode group 11B has the same structure as the structure of the first electrode group 11A, so the description of its structure is omitted. FIG. 5A is an enlarged schematic cross-sectional view of a portion of the outer part of the first electrode group 11A (hereinafter will simply be referred to as the electrode group 11A) in the stacking direction when taken along a plane orthogonal to the height direction, including a portion of the separator 40, a portion of the positive electrode 20, and a bonded portion 50a which is an bonded portion of the adhesive 50 which will be described below.

As illustrated in FIG. 5A, the separator 40 includes a base material 40a and a heat-resistant layer 40b provided on one side of the base material 40a in the thickness direction. The base material 40a is made of a porous sheet having ion permeability and insulating characteristics. For example, the separator 40 may be made of a porous base material mainly including at least one material selected from a group consisting of polyolefin, polyvinylidene difluoride, polytetrafluoroethylene, polyimide, polyamide, polyamide-imide, polyethersulfone, polyetherimide, and aramid, and is preferably made of polyolefin, and more preferably polyethylene and polypropylene. The heat-resistant layer 40b is provided, for example, to protect the separator 40 from heat at the event of short-circuit between the positive electrode 20 and the negative electrode 30. The heat-resistant layer 40b includes inorganic particles such as aluminum oxides, and is made of, for example, a ceramic heat-resistant layer or the like.

The electrode group 11A further includes the adhesive 50. Specifically, after the heat-resistant layer 40b is formed on the entire surface of one side in the thickness direction of the base material 40a by an existing method such as vapor deposition, a plurality of dot-shaped adhesives (dot-shaped portions) is disposed by printing or the like on the entire surface of one side of the separator 40 with the heat-resistant layer 40b formed thereon and on the entire surface of the other side of the separator 40 without the heat-resistant layer 40b formed thereon with an approximately constant area density. The amount of adhesive included in each dot-shaped adhesive of the plurality of dot-shaped adhesives is approximately the same. A number density of the dot-shaped adhesives is approximately the same over the entire areas of the one side surface and the other side surface of the separator 40. Instead of the dotted form, the adhesive 50 may be applied to all over the surface of the separator. That is, the adhesive may be applied to at least one of the one side surface and the other side surface of the separator with an approximately constant area density, thus forming the adhesive layer on at least one side surface of the separator. As the adhesive 50, an acrylic resin-based adhesive, a urethane resin-based adhesive, an ethylene vinyl acetate resin-based adhesive, or an epoxy resin-based adhesive can be used.

In this example, the positive electrodes 20 and the negative electrodes 30 are alternately stacked via the separator 40 so that one side surface of the separator 40, on which the adhesive is disposed, faces the positive electrode 20 to form a stacked body, and to which pressure and heat are applied from both sides of the stacking direction by hot plates placed on one side and the other side in the stacking direction to partially melt the adhesive. In this way, the separator 40 is bonded to the positive electrode 20 with adhesive, and the separator 40 is bonded to the negative electrode 30 with adhesive. This prevents misalignment of the separator 40 relative to the positive electrode 20 and the negative electrode 30, and prevents a decrease of the power generation performance.

For the hot plates, any temperature equal to or higher than the temperature at which the adhesive used melts may be used. The pressure to be applied to the stacked body by two hot plates is preferably lower than the pressure that has been conventionally used. Specifically, as a set of temperature and pressure to be applied to the stacked body, the secondary battery 10 of the present disclosure intentionally uses a set of temperature and pressure for not melting at least a portion of the adhesive applied to the separator (or a portion of the separator (in the case of a zigzag fold separator)) located in the center in the stacking direction of the stacked body and not increasing the bonded area of the adhesive.

Figure 5B:
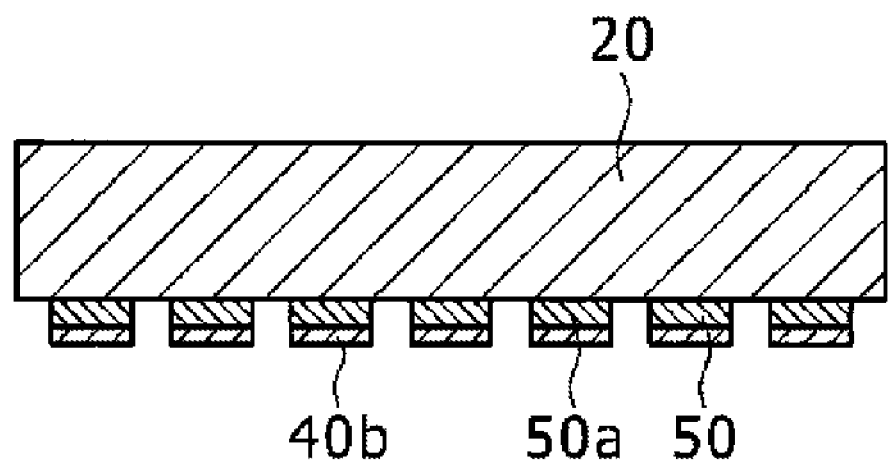
FIG. 5B illustrates a portion of the first electrode group when the positive electrode is stripped.
Figure 6A:
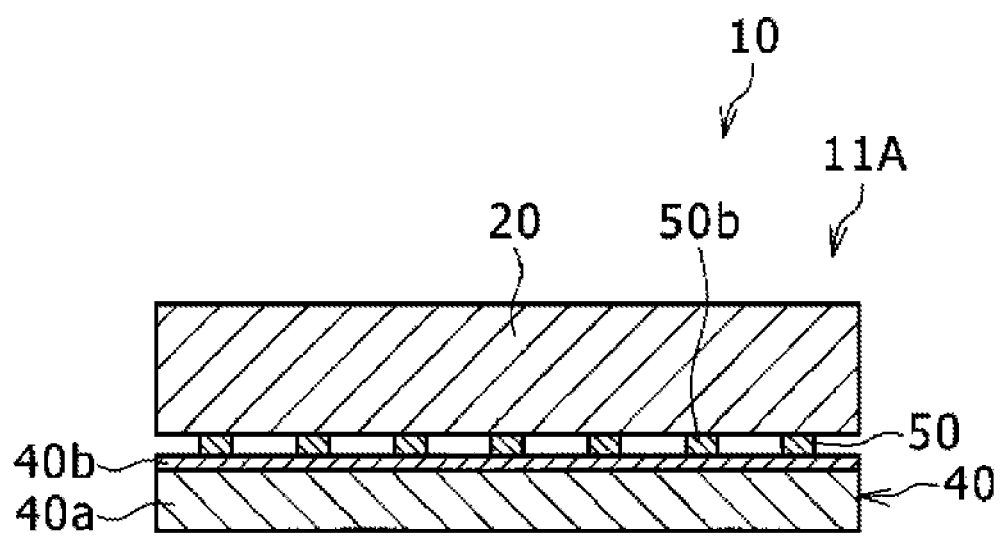
FIG. 6A is an enlarged schematic cross-sectional view of a portion of the inner part of the first electrode group in the stacking direction when taken along a plane orthogonal to the height direction.

FIG. 6A is an enlarged schematic cross-sectional view of a portion of the inner part of the electrode group 11A in the stacking direction when taken along a plane orthogonal to the height direction, in a case where the stacked body is pressed using the set of temperature and pressure, including a portion of the separator 40, a portion of the positive electrode 20, and a bonded portion 50b that is a bonded portion of the adhesive 50. In FIGS. 5A and 6A, and FIGS. 5B and 6B which will be described below, the portions of the adhesive 50 that do not contribute to adhesion are not illustrated for ease of understanding.

As illustrated in FIGS. 5A and 6A, as a result of pressing the stacked body using the set of temperature and pressure in the case of the secondary battery 10 of the present disclosure, the volume (area) of the bonded portion 50b that contributes to adhesion in the adhesive 50 on the separator located at the inner part in the stacking direction (or a portion of the separator at the inner part in the stacking direction) is smaller than the volume (area) of the bonded portion 50a that contributes to adhesion in the adhesive 50 on the separator located at the outer part in the stacking direction (or a portion of the separator at the outer part in the stacking direction).

In the past, the pressing process has not been carried out under physical conditions of not melting a portion of the adhesive applied to the separator, because such physical conditions would prevent exertion of the effect in the portion of the applied adhesive and cause an increase of the material cost. However, the inventors of the present application have found that, by intentionally adopting the structure that has previously been avoided, a remarkable effect outweighing the problem of the increased material cost can be obtained. In the following, a method for confirming whether the secondary battery is in the above state and its remarkable effect will be described using a nonaqueous electrolyte secondary battery as an example of the secondary battery.

[Example of Secondary Battery]

The inventors of the present application fabricated an example of the secondary battery. In the example the secondary battery, the positive electrode, negative electrode, and the separator were fabricated, and the nonaqueous electrolyte was prepared as follows. In addition, the electrode body was fabricated using the fabricated positive electrode, the negative electrode, and the separator, and the battery was assembled as follows.

[Fabrication of Positive Electrode]

A positive electrode mixture layer was formed on both sides of an aluminum foil having a thickness of 13 μm. The thickness of the positive electrode mixture layer was 62 μm on one side after compression treatment. The length of the positive electrode plate in a shorter direction was 76.5 mm. The width (length in the shorter direction) of a current collecting tab where the positive electrode core body was exposed was 19.6 mm. The longitudinal length of the positive electrode plate was 138.9 mm. The positive electrode mixture layer included lithium nickel-cobalt-manganese composite oxide as the positive electrode active material, acetylene black as the conductive material, and polyvinylidene fluoride (PVDF) as the binder material in the mass ratio of 97:2:1.

[Fabrication of Negative Electrode]

A negative electrode mixture layer was formed on both sides of a copper foil having a thickness of 8 μm. The thickness of the negative electrode mixture layer was 76 μm on one side after compression treatment. The length of the negative electrode plate in the shorter direction was 78.2 mm. The width (length in the shorter direction) of the current collecting tab where the negative electrode core body was exposed was 18.2 mm. The longitudinal length of the negative electrode plate was 142.8 mm. The negative electrode mixture layer included graphite as the negative electrode active material, carboxymethyl cellulose (CMC), and styrene-butadiene rubber (SBR) as the binder in the mass ratio of 98:1:1.

[Separator]

As the separator used, a ceramic heat-resistant layer was coated on one side of a polyethylene single-layer base material, and an adhesive layer made of acrylic resin was applied in dots on both sides. The thickness of the base material layer of the separator was 12 μm, the thickness of the heat-resistant layer was 4 μm, and the width was 80.7 mm. The width was set to 80.7 mm. The amount of adhesive in each dot-shaped adhesive was made to be approximately the same. All the dot-shaped adhesives were made to be approximately the same. A number density of the dot-shaped adhesives was made to be approximately constant over the entire areas of the one side surface and the other side surface of the separator.

[Preparation of Nonaqueous Electrolyte]

Ethylene carbonate (EC), ethyl methyl carbonate (EMC), and diethyl carbonate (DEC) were mixed in a volume ratio (at 25° C., 1 atm) of 30:30:40 to prepare a mixture solvent. To this mixture, $LiPF_6$ was added at 1.15 mol/L to prepare the nonaqueous electrolyte.

[Fabrication of Electrode Assembly]

The number of stacked positive electrode plates was 35 layers and the number of stacked negative electrode plates was 36 layers. A single sheet of separator was folded in a zigzag with the folded portions insulated from each other, and the positive electrodes and the negative electrodes were stacked so that the current collecting tabs of the positive and negative electrodes did not overlap each other. Thus, the stacked body was fabricated. Subsequently, a pressure of 2 MPa was applied to the stacked body using hot plates set to 100° C. from both sides in the stacking direction of the stacked body to fabricate the one electrode group. The other electrode group was also fabricated by the same method.

[Assembly of Battery]

The plurality of stacked positive electrode core exposed portions were electrically connected to the positive electrode terminal via the positive electrode current collector. The plurality of stacked negative electrode core exposed portions were electrically connected to the negative electrode terminal via the negative electrode current collector. The positive electrode terminal and the negative electrode terminal were fixed to a sealing body via insulating members. The sealing body included a gas discharge valve that was opened when a predetermined pressure is applied. The positive electrode current collector, the positive electrode terminal, and the sealing body were made of aluminum or aluminum alloy. The negative electrode current collector and the negative electrode terminal were made of copper or copper alloy. The two electrode groups were bonded in the overlapped state to the sealing body, and then inserted into the outer can with one side thereof being opened and an insulating sheet made of a resin material interposed around the periphery of outer can. The outer can was made of aluminum or aluminum alloy, for example. The sealing body was fitted into the opening of the outer can, and the fitted portion of the sealing body and the outer can was laser welded. The sealing body was made of aluminum or aluminum alloy. The above-described nonaqueous electrolyte was injected from the electrolyte injection port, and then the electrolyte injection port was sealed with blind rivets, thus fabricating a rectangular nonaqueous electrolyte secondary battery having an external dimensions of 148 mm (width)×91 mm (height)× 26.5 mm (thickness).

[Test Details]

Figure 6B:
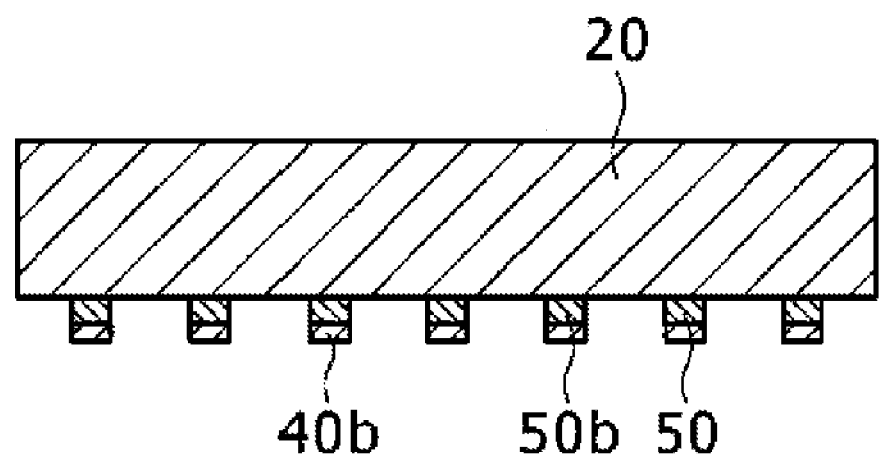
FIG. 6B illustrates a portion of the first electrode group when the positive electrode is stripped.

The following tests were conducted on the electrode group used in the secondary battery of the above example. Specifically, each positive electrode was stripped from the separator after the pressing process using the hot plate, and the adhesive transfer rate in the stacking direction was measured. The adhesive strength between the heat-resistant layer of the separator and the base material was relatively weak at about 5 to 7 N/m. Therefore, when the positive electrode was stripped from the separator, the bonded portion of the adhesive was not stripped from the positive electrode and the heat-resistant layer, but the heat-resistant layer was stripped from the base material. In other words, when the positive electrode 20 was stripped from the separator 40 in the electrode group illustrated in FIGS. 5B and 6B, the bonded portions 50a, 50b were not stripped from the positive electrode 20 and heat-resistant layer 40b, respectively, as illustrated in FIGS. 5B and 6B, and the portions of the heat-resistant layer 40b adhered to the bonded portions 50a, 50b were cut off from the separator 40 and separated from the separator 40 together with the bonded portions 50a, 50b.

Figure 7A:
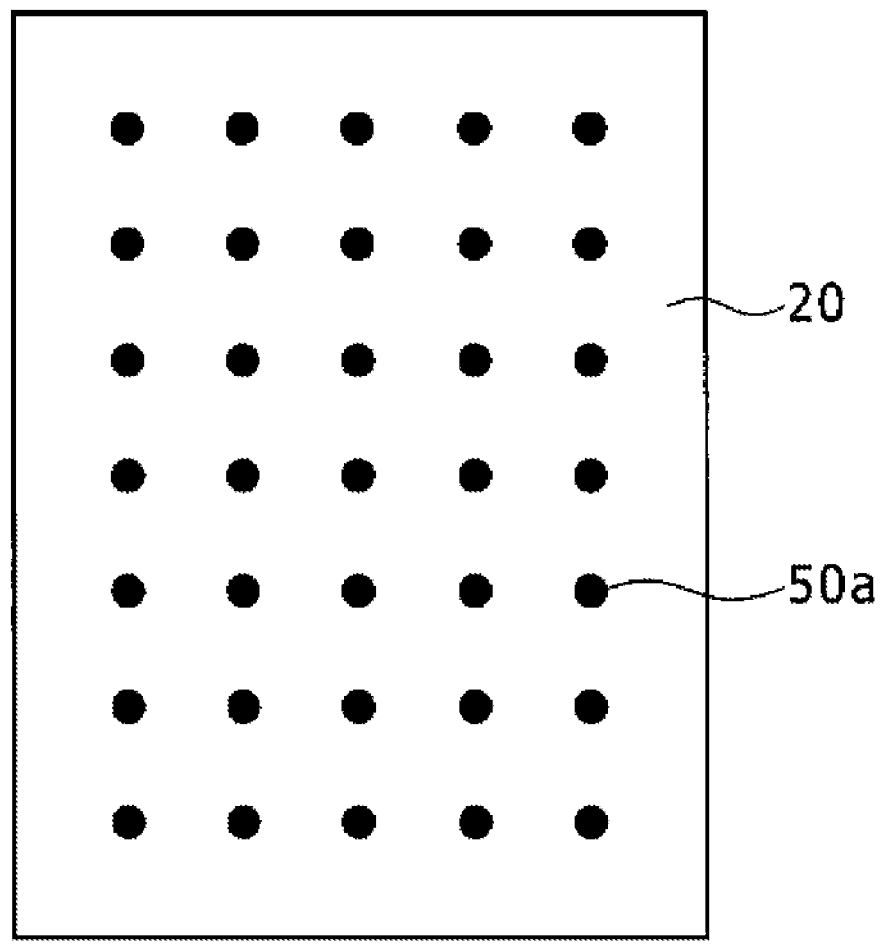
FIG. 7A is a schematic plan view of an example of a secondary battery illustrating an bonded portion transferred to the stripped positive electrode, in which the bonded portion is transferred to the positive electrode on the outer side in the stacking direction.
Figure 7B:
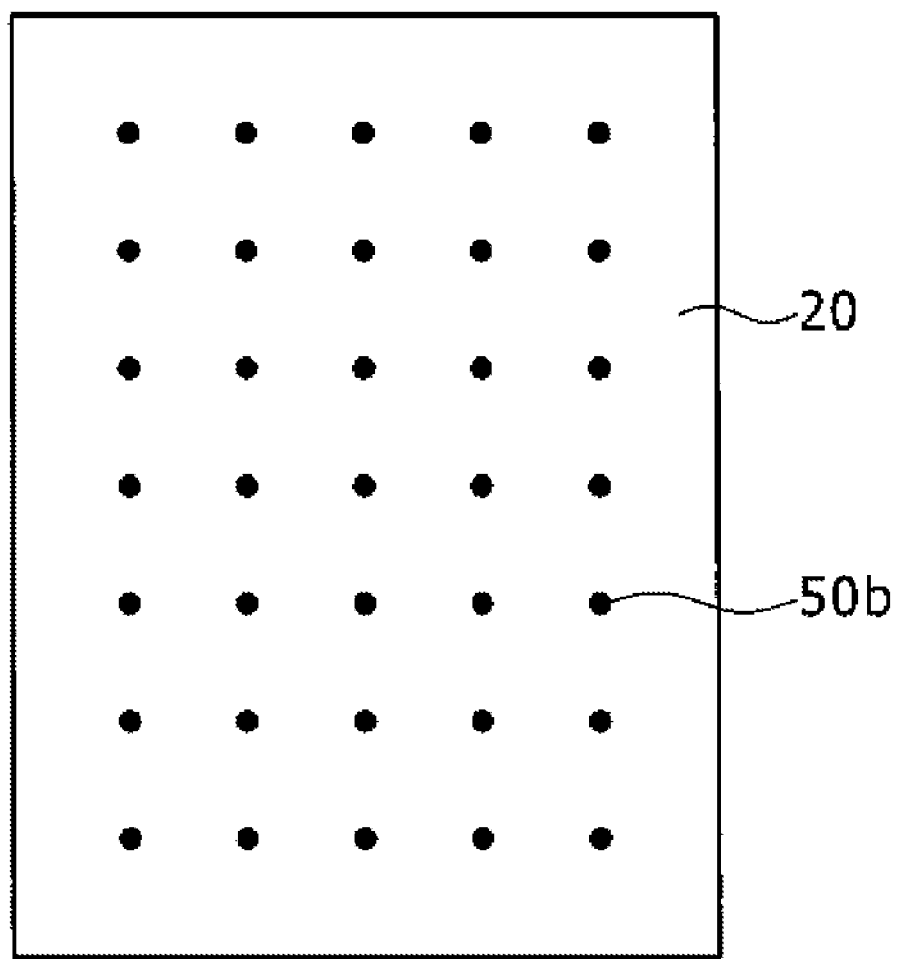
FIG. 7B is a schematic plan view of an example of a secondary battery illustrating an bonded portion transferred to the stripped positive electrode, in which the bonded portion is transferred to the positive electrode on the inner side in the stacking direction.

Thus, the bonded portions 50a, 50b of the adhesive 50 were transferred to the positive electrode 20. By measuring the area of the bonded portions 50a, 50b transferred to the stripped positive electrode 20, the areas of the bonded portions 50a, 50b in each positive electrode 20 were identified. This is described by referring to FIGS. 7A and 7B. FIGS. 7A and 7B are schematic plan views of the example of the secondary battery illustrating the bonded portions transferred to the stripped positive electrode 20, in which FIG. 7A is a schematic plan view illustrating the bonded portions transferred to the positive electrode 20 located at the outer part in the stacking direction, and FIG. 7B is a schematic plan view illustrating the bonded portion transferred to the positive electrode 20 located at the inner part in the stacking direction. In the electrode group of the secondary battery of the present disclosure, the pressing pressure to be applied in the pressing process using the hot plate was decreased, causing it difficult for the adhesive located at the inner part in the stacking direction to melt, and increasing the ratio of the non-bonded portions which do not exert the adhesive strength in the adhesive material. In other words, as illustrated in FIGS. 7A and 7B, the area of the bonded portions 50a, 50b transferred to the positive electrode 20 was changed between the inner part and the outer part in the stacking direction. Therefore, it is possible to determine whether the secondary battery of the present disclosure has been fabricated by simply measuring the area of the bonded portions transferred to the stripped positive electrode 20.

[Test Results]

Figure 8:
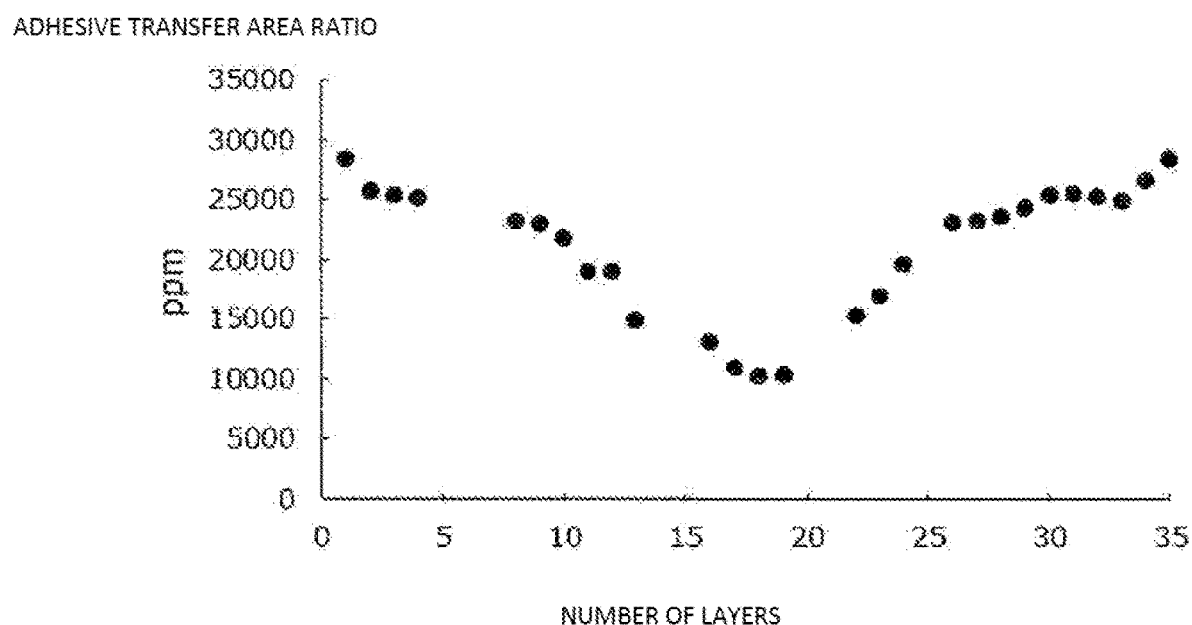
FIG. 8 is a graph showing the adhesive transfer area ratio representing the relationship between the number of layers in the stacked layer group and the ratio of the transferred area to the area of one side surface of the positive electrode.
Figure 9:
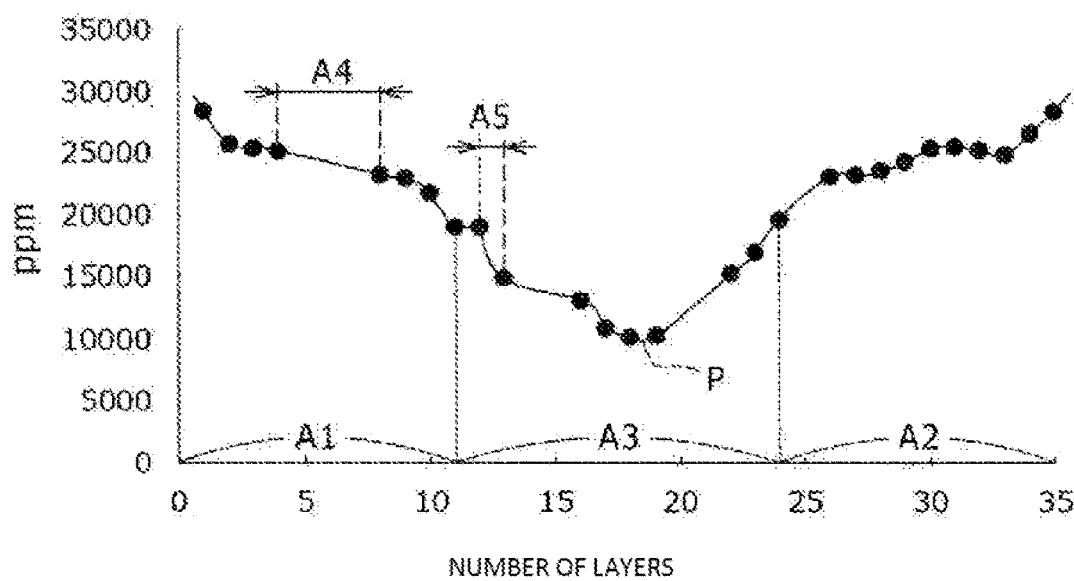
FIG. 9 is a graph showing a spline curve that passes through all measurement points in FIG. 8.
Figure 10:
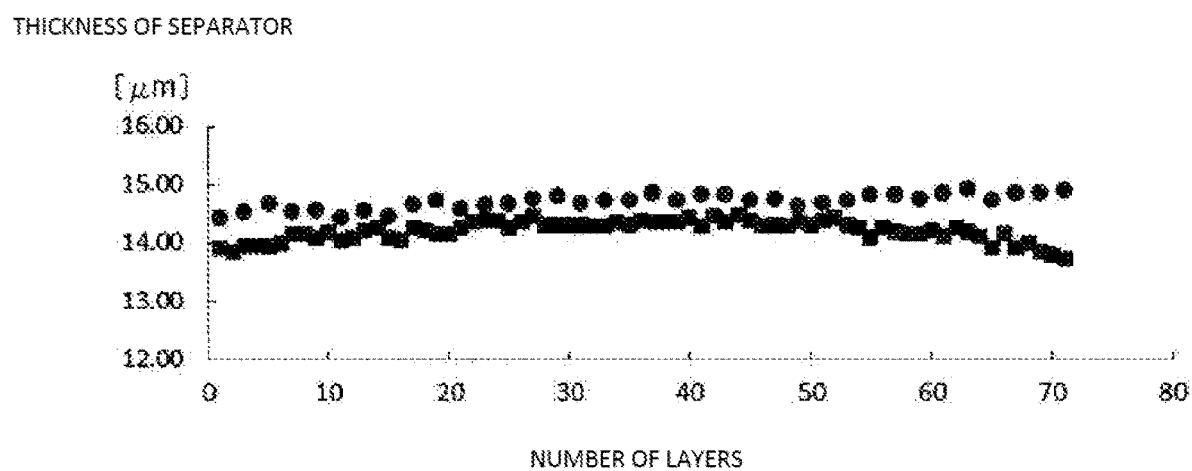
FIG. 10 is a graph showing the relationship between the number of layers and the thickness of the separator, in which the dots represent the thickness of the separator before pressing by a hot plate, and the solid line represents the thickness of the separator after pressing by the hot plate.

FIGS. 8 to 10 are graphs showing the test results. Specifically, FIG. 8 is a graph showing the relationship between the number of layers in the stacked layer group (the number indicating how many positive electrodes there are from one side in the stacking direction) and the ratio of the transferred area to the area of the one side of the positive electrode, thus showing the adhesive transfer area ratio. FIG. 9 is a graph showing a spline curve that passes through all measurement points in FIG. 8. A spline curve is a smooth curve that passes through a finite number of sequence points given, and this curve is widely used in the shape design in CAD and other applications. The function that represents a spline curve is called a spline function. In the following, spline curves may be used to define the technical scope of the present disclosure, and such a definition is satisfied if there is at least one spline curve that satisfies the definition. In other words, there are a plurality of types of the spline function that defines the spline curve, such as a basic spline (B-spline), a cardinal spline (C-spline), a natural spline (N-spline), and the like, and, in such a background, to determine whether the spline curve satisfies the definition of the spline curve described below, it is considered in the present specification that there is at least one spline curve that satisfies the definition and that is smooth and differentiable from one end to the other end. In determining the differentiability at one end or the other end, the spline curve is considered to be differentiable if the function is right differentiable or left differentiable at the one end or the other end, respectively. FIG. 10 is a graph showing the relationship between the number of layers (the number indicating how many pairs of electrode plates there are from one side in the stacking direction) and the thickness of the separator, in which the dots represent the thickness of the separator before pressing by the hot plate, and the solid line represents the thickness of the separator after pressing by the hot plate.

Although FIGS. 8 to 10 show the test results of one test example, the electrode group capable of achieving similar results can easily be fabricated. Specifically, such an electrode group can easily be fabricated by applying the temperature and pressure not melting a part of the adhesive applied to the separator (or a portion of the separator (in the case of a zigzag fold separator)) located in the center in the stacking direction of the stacked body and not increasing the bonded area during pressing by the hot plate. It can also be easily fabricated by countless combinations of temperature and pressure to be applied during pressing by the hot plate. Furthermore, such a group of electrodes can be easily fabricated by pressing at a temperature around the lower melting limit of the adhesive used, and by performing the pressing process at a pressure of 90% or less of the pressure applied to melt all the adhesives.

In one example, as shown in FIG. 8, the areas of the bonded portions of the adhesive applied to the two outermost separators in the stacked body are both larger than the area of the bonded portion of the adhesive applied to the separator located in the center in the stacked body.

As shown in FIG. 9, the spline curve has a local minimum value, point P, at which the area of the bonded portion is the smallest, in a third section A3, when the electrode group is divided into three equal sections: a first section A1 in which the number of stacked layers is small (near the beginning of the stack), a second section A2 in which the number of stacked layers is large (near the end of the stack), and a third section A3 in which the number of stacked layers is between the numbers of the first section A1 and the second section A2.

Also, as shown in FIG. 9, there are a fourth section A4 and a fifth section A5 that satisfy the condition that the maximum rate of change in the fourth section A4 of the spline curve is smaller than one third of the minimum rate of change in the fifth section A5 which is located on the inner side of the fourth section A4 in the stacked layers.

In one example, as shown in FIG. 10, the thickness of the two outermost separators is at least 80% of the thickness of the separator located in the middle of the stacked layers of the stacked layer group. In addition, the maximum amount of crush in the thickness direction of the separator after the pressing process compared to the thickness of the separator before the pressing process is about 1.0 μm (the amount of crush in the thickness direction after the pressing process compared to the thickness of the separator before the pressing process is not more than 7%). In other test cases conducted by the inventors, the thickness of the two outermost separators is at least 90% of the thickness of the separator in the middle of the stacked layers of the stacked layer group. Furthermore, the maximum amount of crush in the thickness direction of the separator after the pressing process is reduced to 5% or less compared to the thickness of the separator before the pressing process. The amount of crush of the separator can be determined from the difference between the thicknesses of the separator before and after the separator in the stacked body is subjected to pressure in the pressing process. Specifically, the separator is taken out from each electrode group before and after the pressing process and the difference in thickness of the separators is determined. Alternatively, the amount of crush of the separator can also be determined in the stacked layer group after the pressing process by using the thickness of the separator located at the part other than the stacked body as the thickness before the pressing process, and determining the difference between the thickness of this separator and the thickness of the separator in the stacked body.

[Preferred Structures and Effects Derived from Each Structure]

According to the present disclosure, unlike the secondary battery of Patent Literature 1 which uses separators with different adhesive application amounts and areas, the adhesive is applied to one side surface of the separator in the thickness direction with the approximately constant area density, so that the secondary battery can be made using only one type of separator, instead of multiple types of separators, and the secondary battery can be mass-produced.

In addition, in the heat pressing process to fabricate the electrode groups 11A, 11B, which are examples of the stacked body, the conditions that have been conventionally avoided because of the possibility to increase the material cost are intentionally used. Namely, the conditions of temperature and pressure for not melting a part of the adhesive applied to the separator (or a portion of the separator (in the case of a zigzag fold separator)) located at the inner part in the stacking direction and not increasing the bonded area are intentionally used. This increases the gap between the electrodes in the inner part in the stacking direction, where the electrolyte (for example, liquid electrolyte) is difficult to permeate, to be wider than that in the outer part in the stacking direction, thus improving the electrolyte permeability at the inner part in the stacking direction of the electrode groups 11A, 11B, and bringing the amount of the electrolyte retained to be approximately uniform regardless of its position in the stacking direction. This not only increases the power generation performance of the secondary battery, but also suppresses the difference in reaction rate depending on the position in the stacking direction, thus improving the durability of the secondary battery.

Furthermore, fabricating the secondary battery using such temperature and pressure conditions for not melting a part of the adhesive applied to the separator on the inner side in the stacking direction and not increasing the bonded area can suppress the degree of crush (crush in the thickness direction) of the outer separators that have been easily crushed in the conventional heat press system. This suppresses the difference in thickness between the outer separators and the inner separators in the stacking direction, and also suppresses the increase in air permeability caused by the crush of the outer separators. From this point of view, it also suppresses the difference in reaction rate depending on the position in the stacking direction, and improves the durability of the secondary battery.

The adhesive 50 may be composed of a plurality of dot-shaped portions. The number density of the dot-shaped portions applied to the separator 40 may be approximately constant.

With this structure, the adhesive 50 can be easily disposed on the separator 40 with the approximately constant area density.

In addition, when the area of the bonded portion of the adhesive 50 and the number of layers are plotted on a two-dimensional coordinate system, where the vertical axis represents the area of the bonded portion of the adhesive 50, and the horizontal axis represents the number of layers with adjacent layers being separated by identical intervals on the horizontal axis, the spline curve that smoothly connects the plurality of plotted points may have a local minimum value at which the area of the bonded portion is the smallest in a third section A3, where the electrode group (stacked body) is divided into three equal sections: a first section A1 in which the number of stacked layers is small (near the beginning of the stack), a second section A2 in which the number of stacked layers is large (near the end of the stack), and a third section A3 in which the number of stacked layers is between the numbers of the first section A1 and the second section A2.

This structure can increase the gap in the inner part over a wide range of inner part, and bring the amount of electrolyte retained to be approximately uniform regardless of its position in the stacking direction.

It may also be possible that a fourth section A4 and a fifth section A5 that satisfy the condition that the maximum rate of change in the fourth section A4 of the spline curve is smaller than one third of the minimum rate of change in the fifth section A5 which is located on the inner side of the fourth section A4 in the stacked layers.

In the inner part in the stacking direction, the electrolyte permeability of the electrolyte tends to deteriorate rapidly toward the inner part in the stacking direction.

In the inner part in the stacking direction, this structure can sharply increase the gap between electrodes toward the inner part in the stacking direction. Therefore, it is possible to form the gap between electrodes that offsets the electrolyte permeability, which deteriorates rapidly as it moves inward, so that the amount of electrolyte retained can be brought to a highly accurate and uniform value regardless of the position of the electrolyte in the stacking direction.

When the odd number of separators are stacked in the stacked body (which is composed of, for example, the electrode group or the electrode assembly), the two outermost separators (or portions of the separator) may have a thickness of at least 90% of the thickness of the separator (or a portion of the separator) located in the middle of the stacked layers of the stacked body. When the even number of separators are stacked in the stacked body, the two outermost separators (or portions of the separator) may have a thickness of at least 90% of the thickness of one of the two separators (or portions of the separator) having a larger thickness.

In this structure, since there is a small difference in thickness between the outer separators and the inner separators in the stacking direction, it is possible to suppress the increase in air permeability caused by the crush of the outer separators and improve the durability of the secondary battery.

The amount of crush of the separator in the thickness direction, which is calculated from the difference between the thicknesses of the outer separator and the inner separator in the stacking direction may be 5% or less compared to the thickness of the separators located outside the stacked body.

With this structure, since the difference in thickness between the outer separators and the inner separators in the stacking direction is small, it is also possible to suppress the increase of the air permeability caused by the crush of the outer separators, and increase the durability of the secondary battery.

The separator 40 may have the heat-resistant layer 40b on at least one side in the thickness direction, so that one side of the separator 40 may be made of the heat-resistant layer 40b.

In this structure, it is possible to measure the area of the bonded portion transferred to the separator 40 easily by the above-described method. Even when it is desired to measure the bonded area of the adhesive in the separator without the heat-resistant layer included in the electrode body or electrode group, the same temperature and pressure can be used, without adding the heat-resistant layer, to perform the heat pressing process to fabricate the electrode body or electrode group. Then, the bonded area is identified in the fabricated electrode body or electrode group using the method described in the present specification.

In the above electrode groups 11A, 11B, the heat-resistant layer 40b is provided only on one side surface of the separator 40, but the heat-resistant layer may also be provided on the other side surface in addition to the one side surface of the separator. Alternatively, no heat-resistant layer may be included in the separator.

In the above electrode groups 11A, 11B, the adhesive is applied to both surfaces on one side and the other side of the separator 40, but the adhesive may be applied to only one side surface of the separator.

The region including the plurality of dot-shaped adhesives is provided on one side surface of the separator 40, the adhesive may be applied to the entire surface of at least one side surface of the separator with the approximately constant area density.

The spline curve described above may not have the local minimum value at which the area of the bonded portion is the smallest in the third section described above. Alternatively, the spline curve described above may have a point of the local minimum value at which the area of the bonded portion is the smallest in the middle section located in the center of five sections when the stacking direction is divided into five equal sections. Also, there may be no fourth section and the fifth section in which the maximum rate of change in the fourth section is smaller than one third of the minimum rate of change in the fifth section which is located on the inner side of the fourth section in the stacked layers.

The thickness of the outer separators in the stacking direction may be smaller than 90% of the thickness of the separator located in the center in the stacking direction, and the amount of crush of the separator in the thickness direction calculated from the difference in thickness between the separator in the stacked body and the separator of the stacked body may be 5% or less compared to the thickness of the separators located outside the stacked body.

Figure 11:
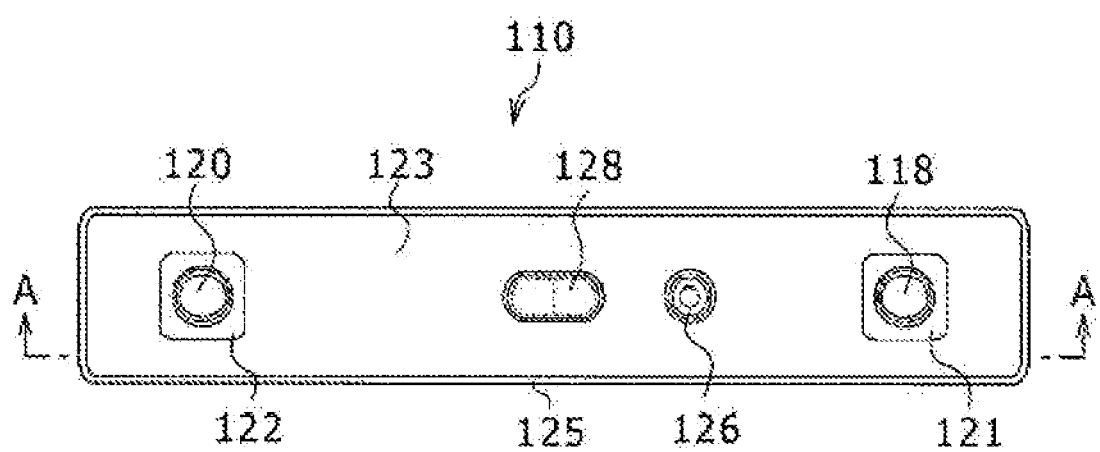
FIG. 11 is a plan view of a wound rectangular secondary battery according to another embodiment.
Figure 12:
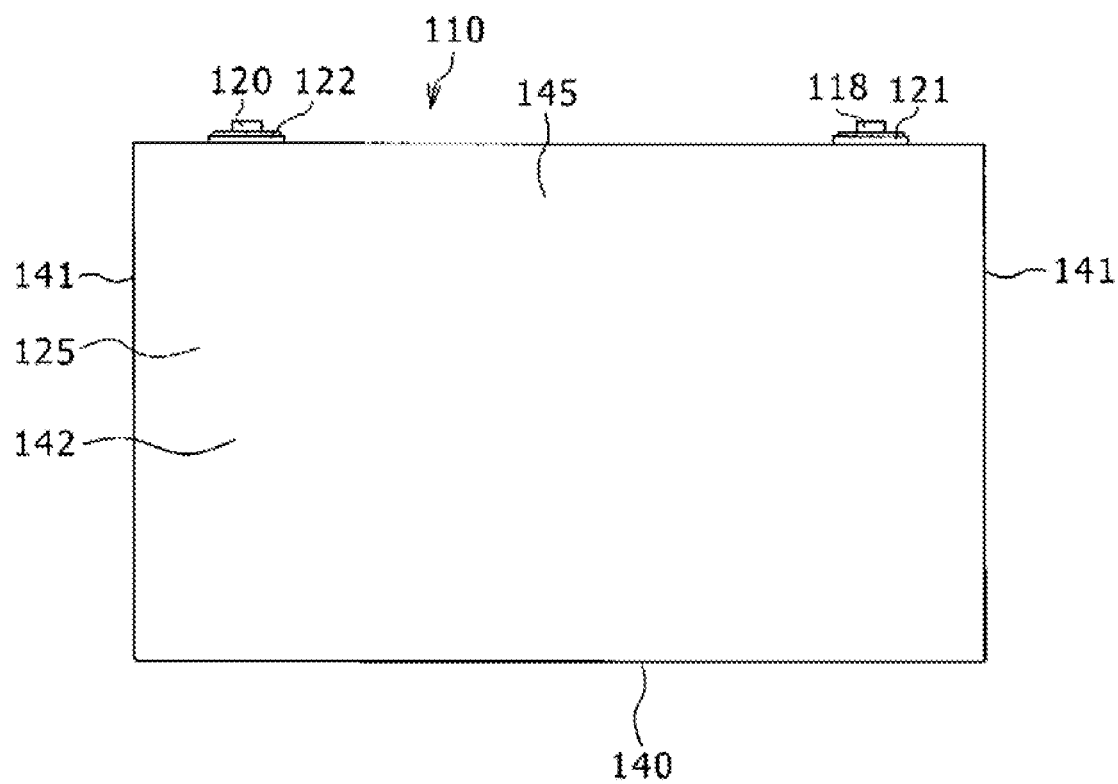
FIG. 12 is a front view of the wound rectangular secondary battery.
Figure 14A:
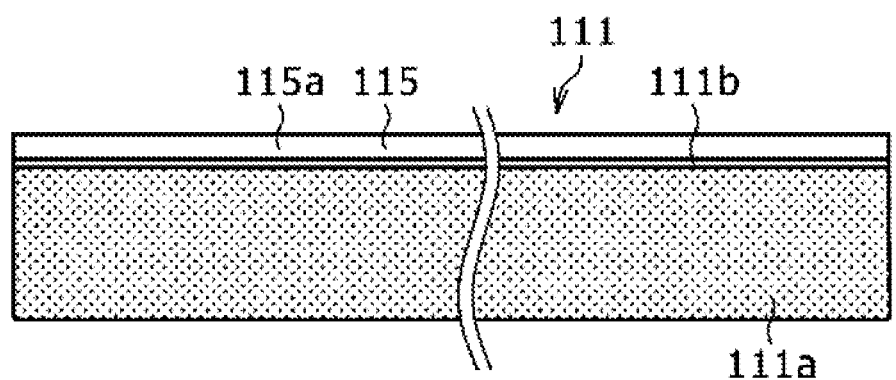
FIG. 14A is a plan view of a positive electrode included in the a wound rectangular secondary battery.
Figure 14B:
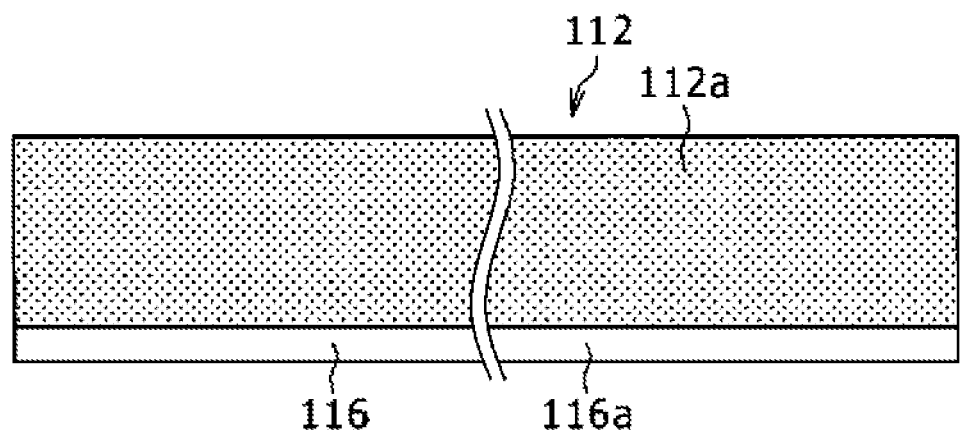
FIG. 14B is a plan view of a negative electrode included in the wound rectangular secondary battery.
Figure 15:
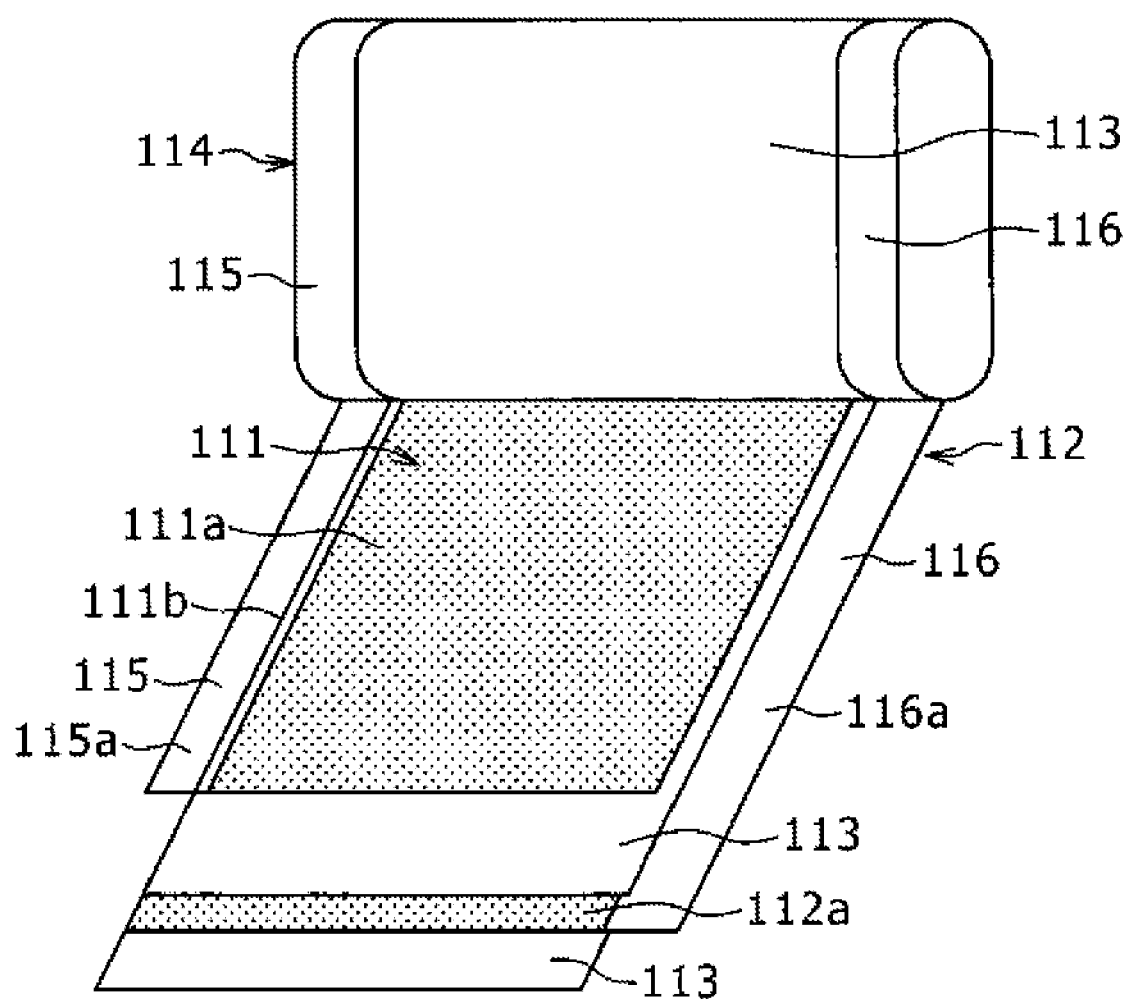
FIG. 15 is an exploded perspective view on the winding end side of a flat wound electrode assembly included in the wound rectangular secondary battery.

The case in which the secondary battery includes the stacked electrode assembly has been described heretofore. Next, a case in which the secondary battery includes a wound electrode assembly is described. FIG. 11 is a plan view of a wound rectangular secondary battery 110, and FIG. 12 is a front view of the rectangular secondary battery 110. FIG. 13(a) is a cross-sectional view taken along line A-A of FIG. 11, FIG. 13(b) is a cross-sectional view taken along line B-B of FIG. 13(a), and FIG. 13(c) is a cross-sectional view taken along line C-C of FIG. 13(a). FIG. 14A is a plan view of a positive electrode included in the rectangular secondary battery 110, FIG. 14B is a plan view of a negative electrode included in the rectangular secondary battery 110. FIG. 15 is an exploded perspective view by exploding the winding end side of a flat wound electrode assembly included in the rectangular secondary battery 110. The same materials as those used for the corresponding components of the stacked secondary battery 10 described above can be used for each of the components of the wound rectangular secondary battery 110. In the following description, therefore, the materials of those members will be described briefly or omitted.

Figure 13:
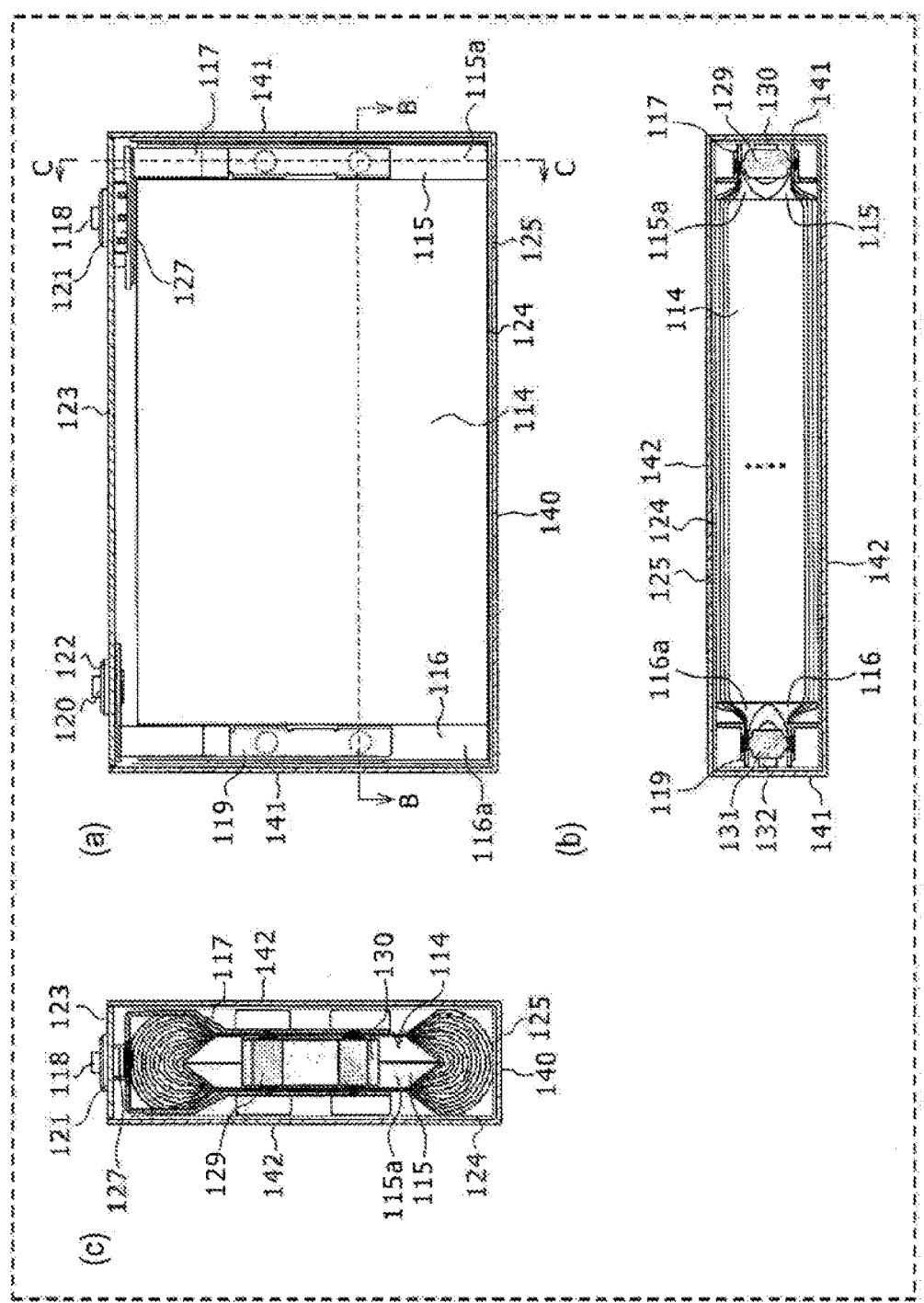
FIG. 13(*a*) is a cross-sectional view taken along line A-A in FIG. 1, FIG. 13(*b*) is a cross-sectional view taken along line B-B in FIG. 13(*a*), and FIG. 13(*c*) is a cross-sectional view taken along line C-C of FIG. 13(*a*).

As illustrated in FIGS. 11 to 13 and 15, the rectangular secondary battery 110 includes an outer can (rectangular outer can) 125 (see FIGS. 11 to 13), a sealing plate 123 (see FIGS. 11, 13(a), and 13(c)), and a flat wound electrode assembly 114 (see FIGS. 13 and 15). The outer can 125 is made of, for example, aluminum or aluminum alloy, with its one end in the height direction being opened. As illustrated in FIG. 12, the outer can 125 has a bottom 140, a pair of first side surfaces 141, and a pair of second side surfaces 142, with the second side surfaces 142 being larger than the first side surfaces 141. As illustrated in FIG. 13(a), the sealing plate 123 is fitted to the opening of the outer can 125. The fitted portion of the sealing plate 123 and the outer can 125 is bonded to form the rectangular battery case 145. The same materials as those used for the corresponding members in the stacked rectangular secondary battery 10 can be used for the materials of each member of the wound secondary battery. Therefore, in the following description of the wound secondary battery, the materials of each member will be described briefly or omitted.

As illustrated in FIG. 15, the wound electrode assembly 114 has a structure in which a positive electrode 111 and a negative electrode 112 are wound with being insulated from each other by a separator 113. The outermost side of the wound electrode assembly 114 is covered with the separator 113, and the negative electrode 112 is placed on the outer periphery side of the positive electrode 111. As illustrated in FIG. 14A, the positive electrode 111 is composed of a belt-like positive electrode core body 115 made of aluminum or aluminum alloy foil having a thickness of from 10 μm to 20 μm by applying a positive electrode mixture slurry to both sides of the positive electrode core body 115, followed by drying, rolling, and cutting it to a predetermined belt-like size. The positive electrode mixture slurry includes the positive electrode active material, the conductive material, the binder material, and the like. At this time, it is ensured that a positive electrode core body exposed portion 115a with no positive electrode mixture layer 111a is formed on both sides along the longitudinal direction at one end of the width direction. On the surface of at least one side of the positive electrode core body exposed portion 115a, for example, it is preferable that a positive electrode protective layer 111b may be formed along the longitudinal direction of the positive electrode core body exposed portion 115a, adjacent to the positive electrode mixture layer 111a. The positive electrode protective layer 111b includes insulating inorganic particles and a binder material. The positive electrode protective layer 111b is less conductive than the positive electrode mixture layer 111a. Providing the positive electrode protective layer 111b can prevent short-circuit between the negative electrode mixture layer 112a and the positive electrode core body 115 caused by foreign substances or the like. The positive electrode protective layer 111b particles can include conductive inorganic particles. Alternatively, the positive electrode protective layer 111b may not be provided.

On the other hand, as illustrated in FIG. 14B, the negative electrode 112 is composed of a belt-like negative electrode core body 116 made of copper or copper alloy foil having a thickness of from 5 μm to 15 μm by applying a negative electrode mixture slurry to both sides of the negative electrode core body 116, followed by drying, compressing, and cutting it to a predetermined belt-like size. The negative electrode mixture slurry includes the negative electrode active material, the binder material, and the like. At this time, a negative electrode core body exposed portion 116a with no negative electrode mixture layer 112a is formed on both sides along the longitudinal direction. The positive electrode core body exposed portion 115a and the negative electrode core body exposed portion 116a may be formed along both ends of the positive electrode 111 and the negative electrode 112, respectively, in the width direction.

As illustrated in FIG. 15, the positive electrode 111 and the negative electrode 112 are displaced from each other in the width direction of the wound electrode assembly 114 (the width direction of the positive electrode 111 and the negative electrode 112) to prevent the positive electrode core body exposed portion 115a from overlapping the negative electrode mixture layer 112a and the negative electrode core body 116a from overlapping the positive electrode mixture layer 111a. Then, the positive electrode 111 and the negative electrode 112 are wound with being insulated from each other across the separator 113 which is coated with the adhesive having an approximately constant area density on at least one side surface in the thickness direction, thus forming a wound assembly. The formed wound assembly is placed between a pair of hot plates and pressed into a flat shape under the condition of the temperature and pressure for not melting part of the adhesive located on the inner periphery side and not increasing the bonded area, thus fabricating the flat wound electrode assembly 114. The wound electrode assembly 114 includes a plurality of positive electrode core body exposed portions 115*a* stacked at one end and a plurality of negative electrode core body exposed portions 116*a* stacked at the other end in the direction in which the winding axis extends (which corresponds to the width direction when the belt-like positive electrode 111, the belt-like negative electrode 112, and the belt-like separator 113 are unrolled into a rectangular shape). As the separator 113, a polyolefin porous film is preferably used. The width of the separator 113 is preferably wide enough to cover the positive electrode mixture layer 111*a* and the positive electrode protective layer 111*b*, and larger than the width of the negative electrode mixture layer 112*a*.

As will be described in detail later, the plurality of stacked positive electrode core body exposed portions 115*a* is electrically connected to the positive electrode terminal 118 via a positive electrode current collector 117 (see FIG. 13(*a*)), and the plurality of negative electrode core body exposed portions 116*a* is electrically connected to the negative electrode terminal 120 via a negative electrode current collector 119 (see FIG. 13(*a*)). Although not described in detail, it is preferable to provide a current shut-off mechanism 127 which is activated when the gas pressure inside the battery case 145 exceeds a predetermined value between the positive electrode current collector 117 and the positive electrode terminal 118, as illustrated in FIG. 13(*a*).

As illustrated in FIGS. 11, 12 and 13(*a*), the positive electrode terminal 118 and the negative electrode terminal 120 are each fixed to the sealing plate 123 via insulating members 121 and 122, respectively. The sealing plate 123 includes a gas discharge valve 128 which is opened when the gas pressure inside the battery case 145 becomes higher than the operating pressure of the current shut-off mechanism 127. The positive electrode current collector 117, the positive electrode terminal 118, and the sealing plate 123 are made of aluminum or aluminum alloy, while the negative electrode current collector 119 and the negative electrode terminal 120 are each made of copper or copper alloy. As illustrated in FIG. 13(*c*), the flat wound electrode assembly 114 is inserted into the outer can 125 which is open on one side, via an insulating sheet (resin sheet) 124 disposed around the electrode assembly except for the sealing plate 123 side.

As illustrated in FIGS. 13(*b*) and 13(*c*), on the positive electrode 111 side, the plurality of wound and stacked positive electrode core body exposed portions 115*a* is converged in the center of the thickness direction and further divided into two parts and converged, and a positive electrode intermediate member 130 is placed between the two parts. The positive electrode intermediate member 130 is made of a resin material, and at least one or, for example, two positive electrode conductive members 129 are held in the positive electrode intermediate member 130. The positive electrode conductive member 129 used has, for example, a cylindrical shape, and cone-shaped portions acting as projections are formed at both ends facing the stacked positive electrode core body exposed portions 115*a*.

Similarly, on the negative electrode 112 side, the plurality of wound and stacked negative electrode core body exposed portions 116*a* is converged in the center of the thickness direction and further divided into two parts and converged. Then, a negative electrode intermediate member 132 is placed between the two parts. The negative electrode intermediate member 132 is made of a resin material, and at least one or, for example, two negative electrode conductive members 131 are held in the negative electrode intermediate member 132. The negative electrode conductive members 131 has, for example, a cylindrical shape and cone-shaped portions acting as projections are formed at both ends facing the stacked negative electrode core body exposed portions 116*a*.

The positive electrode conductive member 129 and the converged positive electrode core body exposed portions 115*a* located on both sides in the extending direction of the positive electrode conductive member 129 are bonded, while the converged positive electrode core body exposed portions 115*a* and the positive electrode current collector 117 located on the outer side in the depth direction of the battery case 145 are also bonded and electrically connected. Similarly, the negative electrode conductive member 131 and the converged negative electrode core body exposed portions 116*a* located on both sides in the extending direction of the negative electrode conductive member 131 are bonded, while the converged negative electrode core body exposed portions 116*a* and the negative electrode current collector 119 located on the outer side in the depth direction of the battery case 145 are also bonded and electrically connected. The end of the positive electrode current collector 117 opposite the positive electrode core body exposed portion 115*a* side is electrically connected to the positive electrode terminal 118, and the end of the negative electrode current collector 119 opposite the negative electrode core body exposed portion 116*a* side is electrically connected to the negative electrode terminal 120. As a result, the positive electrode core body exposed portion 115*a* is electrically connected to the positive electrode terminal 118, and the negative electrode core body exposed portion 116*a* is electrically connected to the negative electrode terminal 120.

The wound electrode assembly 114, the positive electrode and negative electrode intermediate members 130, 132, and the positive electrode and negative electrode conductive members 129, 131 are bonded to form an integrated structure. The positive electrode conductive member 129 is preferably made of aluminum or aluminum alloy, which is the same material as used in the positive electrode core body 115. The negative electrode conductive material 131 is preferably made of copper or copper alloy, which is the same material as used in the negative electrode core body 116. The shape of the positive electrode conductive member 129 and the negative electrode conductive member 131 may be the same or different.

Resistance welding, laser welding, or ultrasonic welding may be used to connect the positive electrode core body exposed portion 115*a* and the positive electrode current collector 117 and to connect the negative electrode core body exposed portion 116*a* and the negative electrode current collector 119. The positive electrode intermediate member 130 and the negative electrode intermediate member 132 may not be used.

As illustrated in FIG. 11 the sealing plate 123 has the electrolyte injection hole 126. The wound electrode assembly 114 to which the positive electrode current collector 117, the negative electrode current collector 119, the sealing plate 123, and the like are attached is disposed in the outer can 125. At this time, it is preferable to insert the wound electrode assembly 114 into the outer can 125 in which the insulating sheet 124 formed into a box or bag shape is disposed in the outer can 125. The fitted portion of the sealing plate 123 and the outer can 125 is welded by laser, and then the nonaqueous electrolyte is injected from the electrolyte injection hole 126. After that, the electrolyte injection hole 126 is sealed to complete fabrication of the secondary battery 110. The electrolyte injection hole 126 may be sealed, for example, with blind rivets or by welding.

The above description has been given for the case where the wound electrode assembly 114 is disposed with its winding axis extending parallel to the bottom of the outer can 125 has been described, but it is also possible to provide the structure in which the wound electrode assembly 114 is disposed with its winding axis extending perpendicular to the bottom of the outer can 125.

Although the example of the wound secondary battery 110 has been described, there is an issue that it is difficult for the electrolyte (liquid electrolyte) to permeate into the central cavity side of the battery in any wound secondary battery 110 including the wound secondary battery 110 described above.

Figure 16A:
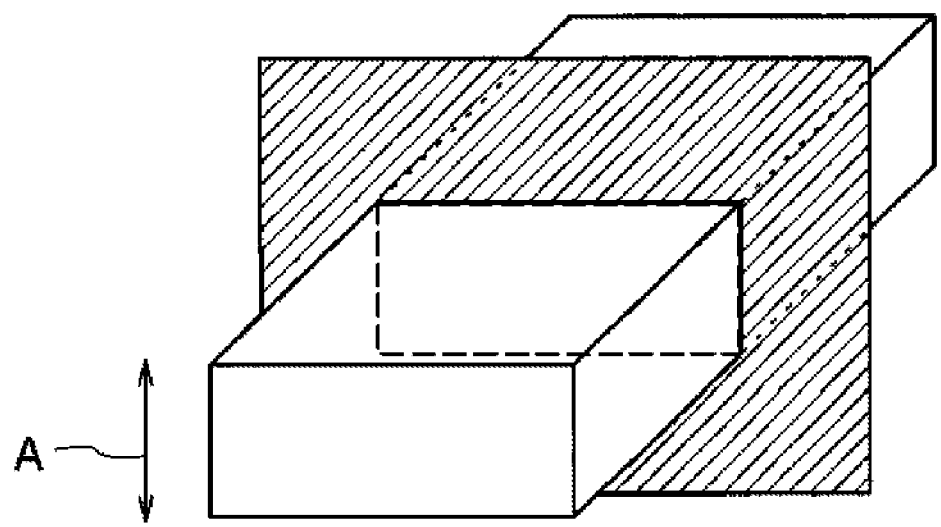
FIG. 16A is a schematic view explaining the correspondence relationship between the stacked electrode assembly and the wound electrode assembly.
Figure 16B:
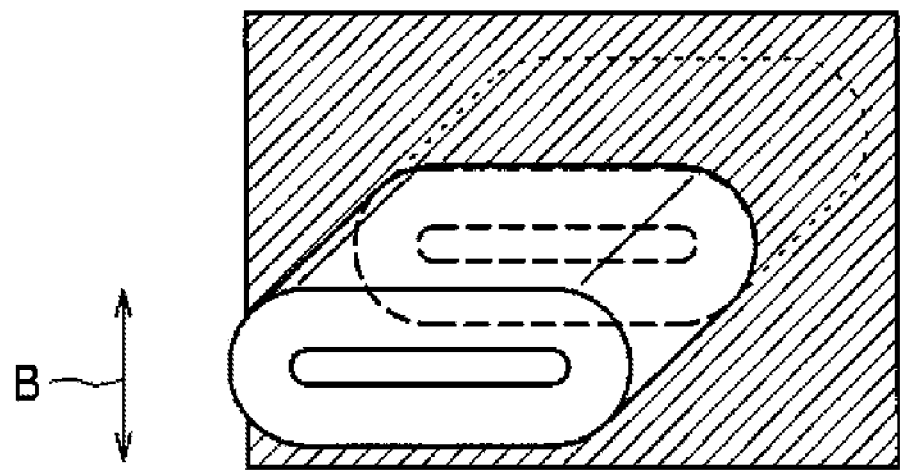
FIG. 16B is a schematic view explaining the correspondence relationship between the stacked electrode assembly and the wound electrode assembly.

Specifically, as illustrated in contrast in FIGS. 16A and 16B, the stacking direction A in the stacked electrode assembly (which coincides with the pressing direction by the hot plate) corresponds to the pressing direction B by the hot plate in the wound electrode assembly. In the wound electrode body, the remarkable effect described above in connection with the stacked electrode group can be obtained by making the area of the bonded portion of the adhesive on the separator on the cavity side (inner periphery side) be smaller than the area of the bonded portion of the adhesive on the separator on the outer periphery side.

Here, for such a wound electrode body can easily be fabricated, as described in detail in connection with the stacked electrode group, by applying the adhesive to at least one of one side and the other side in the thickness direction of the separator with the approximately uniform area density (for example, as described above, applying the dotted region consisting of a plurality of identical dots of adhesive by printing to the separator with the uniform area density), followed by the pressing process by the hot plate at the temperature and pressure conditions for not melting part of the adhesive on the inner periphery side and not exerting the adhesive effect.

REFERENCE SIGNS LIST

- 10 Secondary battery
- 11 Electrode assembly
- 11A, 11B Electrode group
- 20, 111 Positive electrode
- 21, 115 Positive electrode core body
- 30, 112 Negative electrode
- 31, 116 Negative electrode core body
- 40, 113 Separator
- 40a Base material
- 40b Heat resistant layer
- 50 Adhesive
- 50a, 50b Bonded portion of adhesive
- 110 Rectangular secondary battery
- 111a Positive electrode mixture layer
- 112a Negative electrode mixture layer
- 114 Wound electrode assembly
- A1 First section
- A2 Second section
- A3 Third section
- A4 Fourth section
- A5 Fifth section

The invention claimed is:

1. A secondary battery, comprising:
a plurality of positive electrodes each including a positive electrode core body and a positive electrode active material disposed on the positive electrode core body;
a plurality of negative electrodes each including a negative electrode core body and a negative electrode active material disposed on the negative electrode core body;
at least one separator; and
an adhesive applied to at least one side surface of the separator in a thickness direction with an approximately constant area density, wherein
the plurality of positive electrodes and the plurality of negative electrodes are alternately stacked via the separator to form a stacked body, and
an area of a bonded portion of the adhesive is larger at an outer part in the stacking direction of the stacked body than at an inner part in the stacking direction.

2. The secondary battery according to claim 1, wherein:
the adhesive is made of a plurality of dot-shaped portions, and
a number density of the dot-shaped portions applied to the separator is approximately constant.

3. The secondary battery according to claim 1, wherein when the area of the bonded portion of the adhesive and a number of stacked layers are plotted on a two-dimensional coordinate system, where the vertical axis represents the area of the bonded portion of the adhesive and the horizontal axis represents the number of stacked layers with adjacent layers being separated by identical intervals on the horizontal axis, a spline curve that smoothly connects a plurality of plotted points has a local minimum value at which the area of the bonded portion is the smallest in a third section, where the stacked body is divided into three equal sections: a first section in which the number of stacked layers is small, a second section in which the number of stacked layers is large, and a third section in which the number of stacked layers is between the numbers of the first section and the second section.

4. The secondary battery according to claim 3, wherein:
the spline curve includes a fourth section and a fifth section in which a condition that the maximum rate of change in the fourth section is smaller than one third of the minimum rate of change in the fifth section which is located on the inner side of the fourth section with regard to the number of stacked layers is satisfied.

5. The secondary battery according to claim 1, wherein:
when the stacked body includes an odd number of the separators, two outermost separators each have a thickness of at least 90% of a thickness of a separator located in the middle of the stacked layers of the stacked body, and
when the stacked body includes an even number of the separators, the two outermost separators each have a thickness of at least 90% of a thickness of one separator which has a larger thickness of two separators having located in the middle of the stacked layers of the stacked body.

6. The secondary battery according to claim 1, wherein:
an amount of crush of the separator in the thickness direction, which is calculated from a difference between a thickness of the separator in the stacked body and another separator located outside the stacked body, is 5% or less compared to the thickness of the separator located outside the stacked body.

7. The secondary battery according to claim 1, wherein the separator includes a heat-resistant layer on at least one side surface in the thickness direction, and
the one side surface is made of the resistant layer.

* * * * *